(12) United States Patent
Cox, Jr.

(10) Patent No.: US 10,835,860 B2
(45) Date of Patent: Nov. 17, 2020

(54) TREATMENT OF HYDROGEN SULFIDE GAS UNDER AEROBIC CONDITIONS

(71) Applicant: BioSystems Consulting Inc., Blacksburg, VA (US)

(72) Inventor: Henry Wilmore Cox, Jr., Blacksburg, VA (US)

(73) Assignee: BioSystems Consulting, Inc., Blacksburg, VA (US)

( * ) Notice: Subject to any disclaimer, the term of this patent is extended or adjusted under 35 U.S.C. 154(b) by 0 days.

(21) Appl. No.: 16/850,417

(22) Filed: Apr. 16, 2020

(65) Prior Publication Data

US 2020/0246747 A1    Aug. 6, 2020

Related U.S. Application Data

(63) Continuation of application No. 15/730,796, filed on Oct. 12, 2017, now Pat. No. 10,639,585.

(60) Provisional application No. 62/408,253, filed on Oct. 14, 2016.

(51) Int. Cl.

| | |
|---|---|
| *B01D 53/52* | (2006.01) |
| *B01D 53/14* | (2006.01) |
| *B01D 53/78* | (2006.01) |
| *B01D 53/96* | (2006.01) |
| *C01B 13/02* | (2006.01) |
| *C07F 15/02* | (2006.01) |

(52) U.S. Cl.
CPC ......... *B01D 53/1493* (2013.01); *B01D 53/52* (2013.01); *B01D 53/78* (2013.01); *B01D 53/96* (2013.01); *B01D 2251/102* (2013.01); *B01D 2251/106* (2013.01); *C01B 13/0211* (2013.01); *C07F 15/025* (2013.01)

(58) Field of Classification Search
CPC .... B01D 53/1493; B01D 53/52; B01D 53/78; B01D 53/96; B01D 2251/90; B01D 53/504; B01D 53/73; B01J 2531/842; B01J 31/2243; B01J 31/403; B01J 31/4061; B01J 38/12

See application file for complete search history.

(56) References Cited

U.S. PATENT DOCUMENTS

| | | |
|---|---|---|
| 4,076,621 A | 2/1978 | Hardison |
| 4,189,462 A | 2/1980 | Thompson |
| 4,622,212 A | 11/1986 | McManus |
| 5,126,118 A | 6/1992 | Hardison |
| 5,648,054 A | 7/1997 | DeBerry |
| 5,738,834 A | 4/1998 | DeBerry |
| 6,589,498 B1 | 7/2003 | Barrere-Tricca et al. |
| 6,960,330 B1 | 11/2005 | Cox |
| 7,279,148 B1 | 10/2007 | Nagl |
| 7,344,682 B1 * | 3/2008 | Nagl ................... B01D 53/504 422/129 |
| 2004/0241068 A1 | 12/2004 | Hesse |

(Continued)

*Primary Examiner* — Sharon Pregler
(74) *Attorney, Agent, or Firm* — Michael Haynes PLC; Michael N. Haynes

(57) ABSTRACT

Certain exemplary embodiments can provide a system, machine, device, manufacture, and/or composition of matter adapted for and/or resulting from, and/or a method for, activities that can comprise and/or relate to contacting an aerobic contaminated gas stream with a solution comprising approximately Ferric MGDA, the aerobic contaminated gas stream comprising hydrogen sulfide.

18 Claims, 11 Drawing Sheets

(56) References Cited

U.S. PATENT DOCUMENTS

2011/0042307 A1     2/2011   VanOrnum
2012/0107205 A1     5/2012   Nagl

* cited by examiner

TREATMENT OF HYDROGEN SULFIDE GAS UNDER AEROBIC CONDITIONS

CROSS-REFERENCES TO RELATED APPLICATIONS

This application claims priority to, and incorporates by reference herein in its entirety, pending U.S. Provisional Patent Application 62/408,253, filed 14 Oct. 2016.

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which.

DESCRIPTION

Figure 1:
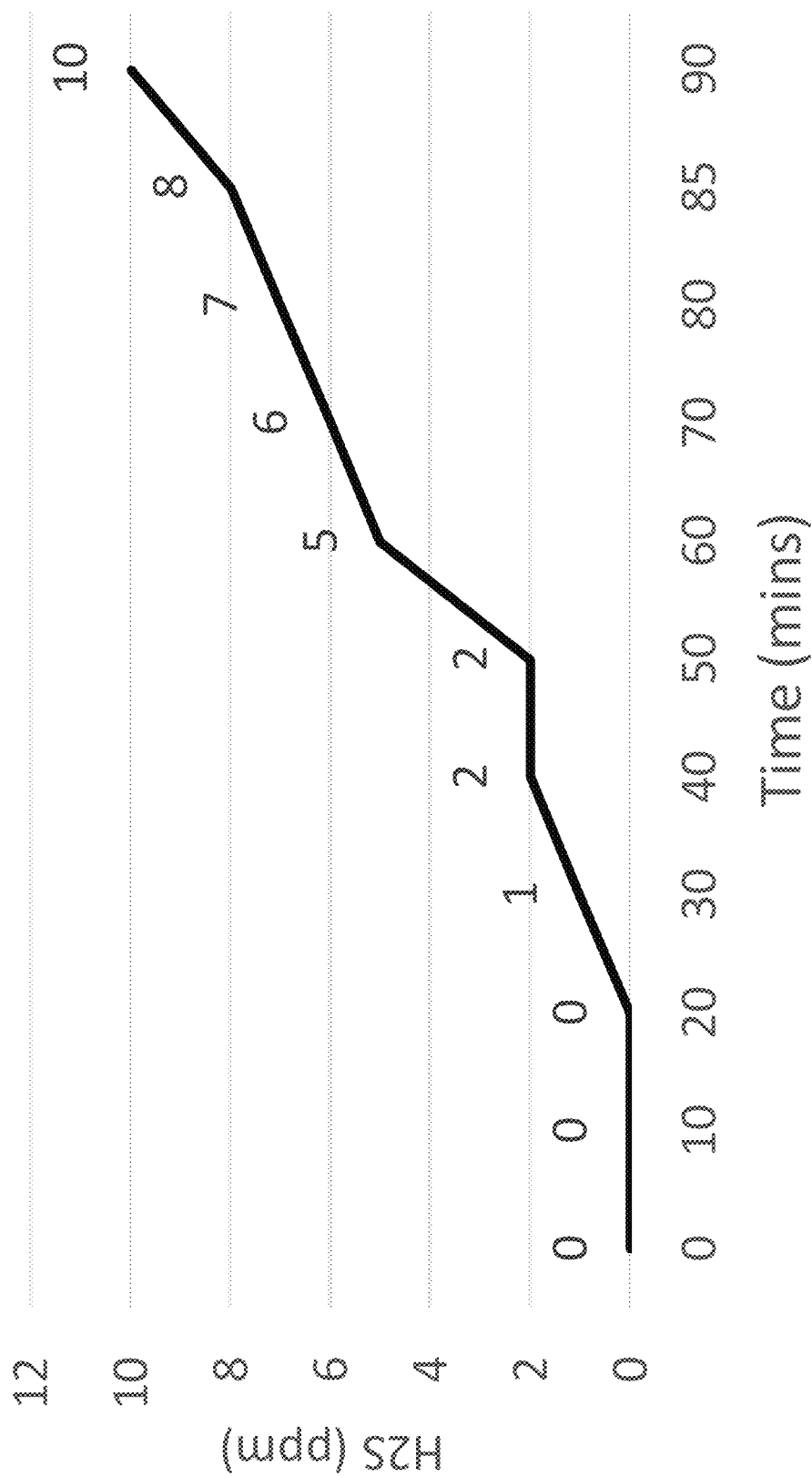
FIG. 1 is a plot of hydrogen sulfide contamination over time in an exemplary experimental embodiment.

Sulfonated organic compounds and hydrogen sulfide (H2S) are a major problem for odor producers around the world. A great number of sulfur-related organic compounds, along with hydrogen sulfide, are primarily produced when organic matter is degraded by microorganisms under anaerobic conditions.

Sources of Hydrogen Sulfide in the Water Treatment Industry

Odor-producing substances found in domestic and industrial wastewater and sludge are small and relatively volatile molecules having molecular weights between 30 and 150 g/mole. Most of these substances result from anaerobic decomposition of organic matter containing sulfur and nitrogen. Inorganic gases produced from domestic and industrial wastewater decomposition commonly include hydrogen sulfide, ammonia, carbon dioxide, and methane. Of these specifically named gases, only hydrogen sulfide and ammonia are malodorous. Often, odor-producing substances include organic vapors such as indoles, skatoles, mercaptans, and nitrogen-bearing organics.

Hydrogen sulfide is the most commonly known and prevalent odorous gas associated with domestic wastewater collection and treatment systems. It has a characteristic rotten egg odor, is extremely toxic, and is corrosive to metals such as iron, zinc, copper, lead and cadmium. Hydrogen sulfide is also a precursor to sulfuric acid formation, which corrodes lead-based paint, concrete, metals and other materials. Hydrogen sulfide poses a major threat to infrastructure world-wide for its highly corrosive nature.

The conditions leading to H2S formation generally favor production of other malodorous organic compounds. Thus, solving H2S odor problems can often solve other odor problems as well. Many of the odors detected in wastewater collection and treatment systems result from the presence of sulfur-bearing compounds, such as allyl mercaptan, amyl mercaptan, benzyl mercaptan, crotyl mercaptan, and/or dimethyl sulfide.

Sources of Hydrogen Sulfide in the Energy Industry

Natural gas consumption has expanded greatly due to technological advances in hydraulic fracturing, an expansion in the scope of end uses, and abundant global reserves. Global consumption of the fuel has risen four-fold over the past 40 years, increasing from 23 trillion cubic feet (TCF) in 1965 to 113 TCF in 2011.

A great deal of variety exists among grades of natural gas. One such grade of natural gas is referred to as sour gas (which is a species of the "dirty gas" or "contaminated gas" referred to herein). Sour gas refers to natural gas that contains significant amounts of low pH, acidic gases such as hydrogen sulfide and carbon dioxide (CO2).

Natural gas that is considered sour contains greater than approximately 5.7 milligrams of H2S per cubic meter (ppm), which is roughly equivalent to 4 parts per million by volume under standard temperature and pressure. In contrast, another such grade of natural gas is referred to as sweet gas. Sweet gas is preferable to sour gas because it does not contain the degree of contaminants found in sour gas. According to the International Energy Agency, excluding North America, sour gas constitutes roughly 43% of the world's total natural gas reserves, with sweet gas comprising the remainder.

There are a variety of reasons why sour gas is problematic for the natural gas industry. These include human health and safety concerns, corrosion of drilling and extraction equipment, and corrosion of gas pipelines used for transportation. According the Occupational Safety and Health Administration (OSHA) hydrogen sulfide has been found to be noticeably odorous at 0.01-1.5 ppm, and can cause nausea and dizziness between 2-20 ppm. At 100 ppm, H2S causes coughing, eye irritation and olfactory fatigue (loss of smell). At 500 ppm, death may occur after 30-60 minutes of exposure and at 1000-2000 ppm death can occur nearly instantly. For these reasons, OSHA has set a general industry ceiling limit of 20 ppm. Between 1993 and 1999, there were fifty-two deaths due to hydrogen sulfide in the United States. Common industries affected by hydrogen sulfide caused deaths included waste management, petroleum and natural gas.

Corrosion of equipment associated with extraction and transportation is also a significant issue that certainly results in enormous costs to industry. While a comprehensive study on the aggregate costs of hydrogen sulfide induced corrosion across the natural gas industry in the United States was not identified, the National Association of Corrosion Engineers (NACE) has estimated total corrosion costs in gas distribution and oil and gas exploration and production to be roughly $6.5 billion per year. Further, several studies have identified hydrogen sulfide gas as a major contributor to corrosion in the oil and gas industry and can be the cause of what is referred to as sulfide stress cracking (SSC) (a.k.a., hydrogen sulfide cracking, sulfide corrosion cracking, and/or sulfide stress corrosion cracking). Regarding natural gas pipelines, SSC can occur both internally due to hydrogen sulfide presence within the pipeline gas and externally where hydrogen sulfide is present in the soil and water around the pipe. Internal SSC has been found to be far more common than external, which is rare. In general, corrosion caused by hydrogen sulfide can take place through two key mechanisms, 1) materials are attacked by acid created when hydrogen sulfide comes into contact with moisture and 2) direct reaction with metals including copper, iron and silver. When considering the abundance of sour gas reserves, it becomes apparent that a significant need exists for technologies that can substantially reduce and/or substantially eliminate hydrogen sulfide in a cost effective and environmentally responsible manner.

Physical and Chemical Properties of Hydrogen Sulfide

Hydrogen sulfide is a colorless gas that has a foul odor (rotten egg smell) and is slightly heavier than air. Human exposure to small amounts of hydrogen sulfide in air can cause headaches, nausea, and eye irritation. Higher concentrations can cause respiratory system paralysis, resulting in fainting and possible death.

H2S presence in wastewater is due not so much to breakdown of organic matter as to the bacterial reduction of sulfate. By this it is meant that certain bacteria are able to split oxygen from the sulfate ion, $SO_4^-$, a common constituent of natural waters, and use it to oxidize organic matter. The sulfur is then left in the form of the sulfide ion, $S^=$, which immediately changes by reaction with water to a mixture of H2S, HS⁻ (read HS ion or hydrosulfide) and $S^=$. It is generally accepted that the amount of each species present is completely dependent on the pH of the water.

H2S is a gas slightly heavier than air. It condenses to a liquid only at the low temperature of −62° C. It is fairly soluble in water. At 20° C., it can dissolve in pure water to the extent of 3850 milligrams per liter (mg/1), or 2.7 liters of H2S gas per liter of water. The solubility decreases about 2.5% for each degree increase of temperature. The stated solubility is the amount that will dissolve when the pure gas is brought into contact with pure water. It is generally accepted that, from H2S diluted with air, hydrogen sulfide will dissolve only in proportion to its concentration in the gas mixture. Thus, for example, air in which the concentration of H2S is 0.1% (1000 parts per million, ppm) by volume of H2S will, if brought to equilibrium with pure water at 20° C., produce a solution containing 3.85 mg/l. Stated differently, water containing 3.85 mg/l of H2S can produce a concentration of 0.1%, or 1000 ppm, in air brought into contact with it. One mg/l in solution can produce a concentration of about 260 ppm by volume in the air if the temperature is 20° C., or 330 ppm by volume if the temperature is 30° C.

TABLE 1

Proportions of H2S and HS− in Dissolved Sulfide

| pH | Proportion of un-ionized H2S | Proportion of HS− |
|---|---|---|
| 5.0 | 0.99 | 0.01 |
| 6.0 | 0.91 | 0.09 |
| 6.2 | 0.86 | 0.14 |
| 6.4 | 0.80 | 0.20 |
| 6.6 | 0.72 | 0.28 |
| 6.8 | 0.61 | 0.39 |

TABLE 1-continued

Proportions of H2S and HS− in Dissolved Sulfide

| pH | Proportion of un-ionized H2S | Proportion of HS− |
|---|---|---|
| 7.0 | 0.50 | 0.50 |
| 7.2 | 0.39 | 0.61 |
| 7.4 | 0.28 | 0.72 |
| 7.6 | 0.20 | 0.80 |
| 7.8 | 0.14 | 0.86 |
| 8.0 | 0.09 | 0.91 |
| 8.2 | 0.059 | 0.941 |
| 8.4 | 0.039 | 0.961 |
| 8.6 | 0.025 | 0.975 |
| 8.8 | 0.016 | 0.986 |
| 9.0 | 0.010 | 0.99 |

When dissolved in water, hydrogen sulfide is partially ionized, so that it exists as a mixture of H2S and HS—. The proportions depend principally upon the pH of the solution. In typical natural water at a temperature of 20° C., and at pH 7.0, it is just 50% ionized; that is, half of it is present as HS— and half as un-ionized H2S. Table 1 shows the proportions ionized at other pH levels. Temperature and mineral content of the water affect the degree of ionization, but only by a small amount. The sulfide ion, $S^=$, also exists in water, but not in appreciable amounts except in solutions in which the pH is above 12. The solubility data given in the previous paragraph applies only to the equilibrium between the gas and the slightly acidic (low-pH) solution produced when it dissolves in pure water or between the gas and the unionized H2S in waters where the pH is not low.

Regulatory Issues Involving Hydrogen Sulfide

Recent rulings by the US EPA placed hydrogen sulfide on the Toxic Substances Control Act (TSCA) list. Further, the Occupational Safety and Health Administration (OSHA) is considering a further reduction for the exposure limits for hydrogen sulfide gas from 10 ppm to 1 ppm for workers. Hydrogen sulfide gas is a major problem in a number of industrial and municipal treatment facilities across the USA and the world. It is a major problem at wastewater treatment operations, landfill sites, and, notably, within the petroleum industry from drilling to production, pipeline transmission, storage and, finally, in refineries.

Treatment of Hydrogen Sulfide

Ferric MGDA in combination with hydrogen peroxide and/or other oxidants can generate hydroxyl and/or free radicals in sufficient quantity to significantly improve the oxidation potential of a solution to a degree that allows for the oxidation of recalcitrant organics and/or halogenated organic compounds that are otherwise not oxidizable by oxidants such as hydrogen peroxide acting alone. This method also can be valuable for improved destruction of hydrogen sulfide and/or other odorous sulfonated organic compounds, such as mercaptans and/or thiols in wastewater applications and/or a "contaminated" gas stream. While hydroxyl and/or free radicals can be a factor in oxidizing sulfide, it has become apparent that another mechanism can help with treatment of hydrogen sulfide other than the straightforward oxidation by hydrogen peroxide and/or free radicals.

Through experimentation, the inventor has discovered a way to use Ferric MGDA to remove hydrogen sulfide from aerobic atmospheric environments, which can be treated when static and/or when flowing as streams of gas (i.e., "gas streams"). Prior to these experiments, it was not suspected that hydrogen sulfide within an aerobic atmospheric environment could be sequestered by making contact within a liquid solution of Ferric MGDA to form a ferrous sulfide MGDA compound. Further, it was not apparent that a ferrous sulfide MGDA compound would then react with the available atmospheric oxygen within an aerobic environment to break (i.e., oxidize) the bond between the iron and sulfide to form elemental sulfur. A further result of this process appears to be the reactivation of ferrous MGDA back to Ferric MGDA as available oxygen oxidizes the ferrous to ferric iron, resulting in the return of the Ferric MGDA to its status as an active sequestering agent for additional sulfide. This cycle appeared to continue, unabated, for numerous recycling events. It is also possible that the ferrous MGDA might play a role in sequestration of sulfide once oxygen oxidizes the bonded sulfide to elemental sulfur by sequestering additional sulfide without a return to ferric sulfide. Both ferric and ferrous MGDA scenarios could be occurring.

Laboratory Studies

Laboratory studies involving bubbling a "dirty gas stream" (a.k.a. "contaminated gas stream") comprising a hydrogen sulfide-containing test gas through a glass column with approximately 0.5% ferric MGDA solution demonstrated that sulfide was being sequestered from the dirty gas stream by the ferric MGDA as a bubble of test gas moved up through the liquid. The 0.5% ferric MGDA solution provided iron within the ferric MGDA at 225 mg/l. Tests of approximately 100 ppm hydrogen sulfide test gas bubbled up through the liquid column resulted in approximately 100% of the H2S gas being removed as the gas bubbles moved up through the approximately one meter tall glass vessel. The initial light tan color occurred while the solution maintained some content of dissolved oxygen from exposure to the atmosphere. Since the hydrogen sulfide test gas contained nitrogen gas as a carrier for the hydrogen sulfide and no oxygen, the oxygen within the liquid was either stripped out of solution by the anaerobic test gas or was consumed in a reaction with hydrogen sulfide in solution to form sulfite and/or sulfate. As shown in FIG. 1, once the oxygen was completely consumed in approximately 20 minutes, the liquid turned progressively more reduced and the color of the solution turned black before breakthrough of hydrogen sulfide began to occur. The reaction of iron and sulfide under these conditions is classically black in color.

Studies for the treatment of hydrogen sulfide within the glass column using Ferric MGDA alone pointed out two things. First, sulfide was being rapidly sequestered by the Ferric MGDA as the gas bubbles moved up through the liquid and, secondly, because the condition of the test assured that the Ferric MGDA was initially aerobic, the hydrogen sulfide within the test gas was being sequestered within an aerobic environment. Oxygen content was monitored from the beginning of the study and tested every 10 minutes during the initial cursory studies using a YSI oxygen meter. Oxygen decreased slowly from the beginning of the study and was completely swept from solution by the hydrogen sulfide test gas within 20 minutes. Initial oxygen levels were approximately 6.3 mg/l at the beginning of the test, approximately 2.9 mg/l after 10 minutes and 0.0 mg/l after 20 minutes. Hydrogen sulfide treatment for the first 20 minutes was complete.

Importantly, in a follow-up repeat study, upon nearly complete breakthrough of hydrogen sulfide in the glass test unit, approximately 20 mg of hydrogen peroxide was added to the failed test vessel resulting in the reactivation of the Ferric MGDA to, once again, completely treat hydrogen sulfide test gas as it passed through the test cylinder. It is surmised that the added peroxide oxidized the bond between the sulfide and Ferric MGDA, which resulted in the release of the sulfide as elemental sulfur. Once reactivated, the test solution could, once again, treat the hydrogen sulfide test gas with no apparent loss of effectiveness. The solution turned a tan to yellowish color upon oxidation with peroxide along with a significant increase in ORP and oxygen content. The ORP rose from approximately −400 my when breakthrough of hydrogen sulfide occurred to + approximately 10 my and oxygen concentration rose from 0.0 mg/l to approximately 6.8 mg/l with the addition of hydrogen peroxide. Subsequent studies resulted in reactivation of the process using atmospheric oxygen alone. It appeared that the efficacy of the sequestration of hydrogen sulfide could occur under aerobic conditions.

Although the reactivation of sulfide saturated Ferric MGDA can occur in a situation where the saturated Ferric MGDA solution is coming from a very low ORP (approximately −400 my) and zero dissolved oxygen conditions with the addition of oxygen or hydrogen peroxide, it is believed that reactivation can continuously occur within a totally oxidized environment, such as can exist within a scrubber system at a typical wastewater treatment plant. Such a reactivation phenomena can be helpful for creating an economical process for this technology in removing toxic and corrosive hydrogen sulfide gas from the atmosphere and/or from a dirty gas stream to create a clean gas stream.

Field Studies

Figure 2:
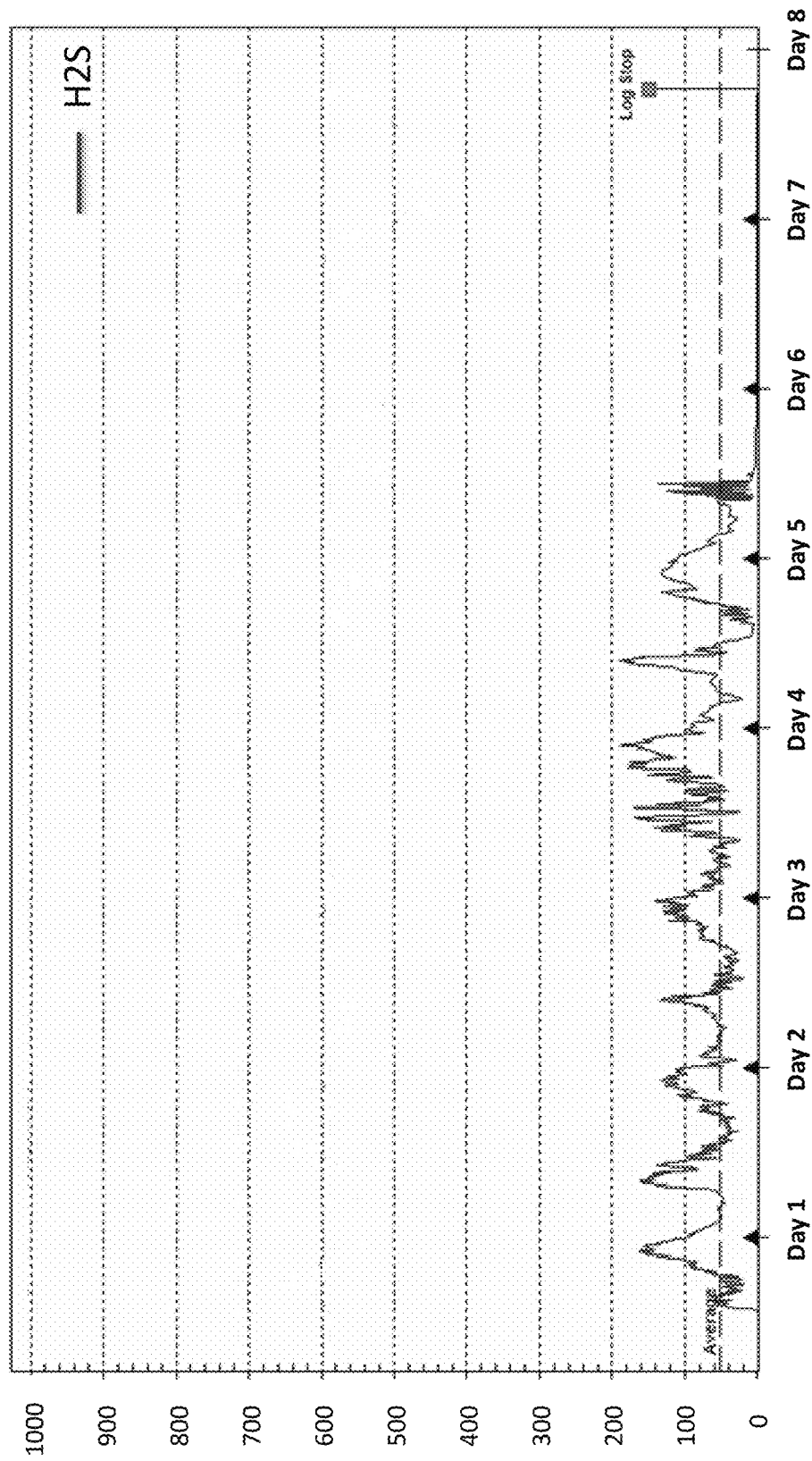
FIG. 2 is a plot of hydrogen sulfide within an aerobic contaminated gas stream in an exemplary experimental embodiment.
Figure 3:
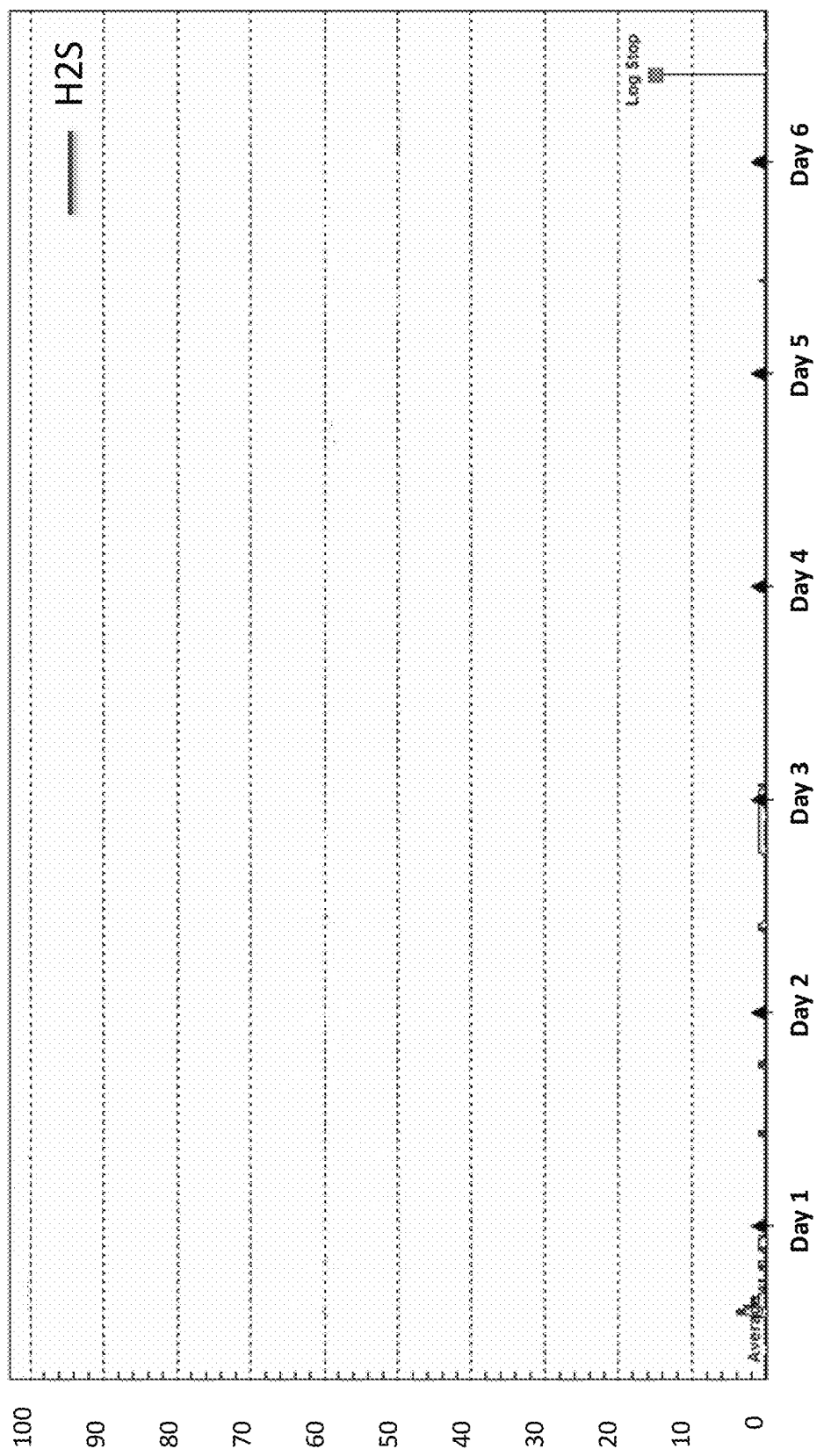
FIG. 3 is a plot of hydrogen sulfide within a aerobic clean gas stream in an exemplary experimental embodiment.

Initial field studies addressed treating an aerobic hydrogen sulfide-containing gas stream (which is a species of a "dirty gas stream") within an aerobic atmosphere. A wastewater plant in Paintsville, Ky. re-commissioned an old packed column scrubber system for a test to use Ferric MGDA to scrub hydrogen sulfide from the aerobic atmosphere of the headworks of their wastewater plant. Concentration of hydrogen sulfide within the gas stream regularly exceeded approximately 150 ppm. Hydrogen sulfide at this concentration can pose a health hazard and/or a considerable corrosion problem for concrete, metal, and/or electrical components it comes in contact with. After significant repairs to this aging equipment, the sump of the scrubber was charged with approximately 160 gallons of Ferric MGDA with an iron content of approximately 22.5 gram/ liter. This concentration of Ferric MGDA constitutes a 50% solution of Ferric MGDA and water. This aqueous solution was continuously recirculated from the sump by a pump that pulled the solution from the sump tank up to the top of the scrubber vessel where the liquid was sprayed onto plastic high surface area column packing and then dripped and/or flowed downward through the packing. A dirty gas stream comprising hydrogen sulfide contaminated air from the headworks of the wastewater plant was blown up through the column packing from the bottom of the scrubber unit. The dirty gas stream flowed up through the column as the Ferric MGDA carrying water pumped up from the sump fell down through the column packing and back into the sump. The Ferric MGDA water was continuously recirculated from the sump, to the top of the column, and down through the column for the entire length of the study. This experiment ran from mid-day on Sep. 15, 2016 to mid-day on Sep. 20, 2016, and was stopped due to a breakdown within the blower that halted flow of the gas stream through the scrubber. The graph shown in FIG. 2 depicts the concentration of hydrogen sulfide within the aerobic dirty gas stream entering the scrubber and the graph shown in FIG. 3 depicts the hydrogen sulfide within the aerobic clean gas stream exiting the unit. The hydrogen sulfide in the gas stream was consistently monitored at the inlet to the blower before treatment and at the exit stack after treatment using Odalogs sold by Detection Instruments of Phoenix, Ariz. It is quite clear from these graphs that the hydrogen sulfide was successfully scrubbed from the gas stream at a high level of efficiency. At the point that these data were collected, approximately 40.8% of the calculated sulfide sequestration capacity within the Ferric MGDA had been realized. A tan colored material (elemental sulfur) was collecting on the vessel site glass. Thus, it appears that sequestration and reactivation were occurring under completely aerobic conditions within the scrubber vessel. Reactivation of the aqueous Ferric MGDA solution under aerobic conditions was verified because the mass of hydrogen sulfide entering the scrubber system substantially exceeded the sequestration capacity of the Ferric MGDA while maintaining approximately zero concentration of hydrogen sulfide exiting the scrubber column in the clean gas stream.

The Effect of Solution pH on VTX Catalyst Efficiency

Purpose

As explained herein, Ferric MGDA (i.e., Ferric-Methyglycinediacetate, which is commercially available as VTX brand catalyst) can be highly effective in removing hydrogen sulfide from aqueous and/or gaseous solutions. In order to design treatment systems that can predictably remove hydrogen sulfide using VTX, it can be helpful to gain an understanding of the limits of the treatment and/or removal process.

This experiment was designed to determine the effect of VTX solution pH on its ability to sequester the sulfur in hydrogen sulfide gas. The concentration of VTX solution was selected at the low end of effectiveness in order to demonstrate sequestration failure within a reasonable period of time.

Hydrogen sulfide gas exists commonly as $H_2S$ in a gaseous state, however, as the concentration of hydroxide ions increases in a water based solution, the molecule begins to speciate from $H_2S$ into a combination of $H_2S$ and hydrosulfide ion (i.e., $HS^-$), which converts to a combination of hydro-sulfide and sulfide ion (i.e., $S^{2-}$) and finally to 100% sulfide ion as the pH levels rise from acidic to basic conditions. These hydrogen sulfide "species" are more reactive, possibly improving the sulfur sequestration ability of VTX catalyst. It was thought possible that the sequestration of sulfur in VTX solutions at a higher pH could perform more efficiently than solutions of a lower pH.

To test this hypothesis, VTX solutions were modified using dilute solutions of caustic soda (NaOH) and hydrochloric acid (HCl) to test a range of pH levels from ~5 to ~9. Two unaltered VTX solutions served as controls at pH of ~7. The experiment was split into two parts to better evaluate the effectiveness of each different solution. Part I of the experiment utilized increasing hydrogen sulfide gas flow rates to analyze each solution's ability to prevent a breakthrough (i.e., gas escaping contact with VTX catalyst particles). Part II utilized a constant flow rate to analyze breakthrough prevention, the amount of hydrogen sulfide gas treated (in milligrams), and whether or not an increase in pH results in an increase in the time until solution saturation. Because of the chosen nature of delivery of hydrogen sulfide (i.e., a standard 200 ppm cylinder of hydrogen sulfide gas within a nitrogen carrier), all experiments quickly went anaerobic upon initiation of hydrogen sulfide sparging through the VTX solutions.

Methods

Two hundred (200) ppm hydrogen sulfide gas within nitrogen gas (which served as a carrier) was passed from a pressurized tank through a Key Instruments Gas Flow Indicator (Model Number MR3A04BVBN) into a 1 liter Ace Glass Incorporated chromatography column (Model Number 5889-40) containing various solutions of VTX catalyst. The pressurized tank was ordered from Custom Gas Solutions and contained a 1000 liter, 2000 PSIG mixture of 200 ppm $H_2S$ gas and a balance of nitrogen gas. The chromatography column contained a fritted disk with a porosity of 70-100 microns and a stopcock to control gas flow. The column had an inner diameter of 50 mm and measured 610 mm from the top of the fritted glass disk to the top of the column. Clear plastic tubing connected the tank to the flow indicator and the chromatography column. A Detection Instruments OdaLog Type L2 $H_2S$ Gas Meter (Model Number SL-H2S-1000, Serial Number 08406489) was placed on top of the column to record instantaneous gas levels in parts per million.

During the first segment of the experiment, the hydrogen sulfide gas was passed through the chromatography column at flow rates ranging from 2 standard cubic feet per hour to 22 standard cubic feet per hour. Flow rates were continuously increased in increments of 2 SCFH every 3 minutes and $H_2S$ gas readings were taken every 30 seconds. Solutions under examination during this trial contained 2 mL VTX and 498 mL distilled water. A solution of one percent Caustic Soda (i.e., NaOH) was used to alter the pH level of each solution to either 7, 8, or 9, and one unaltered solution was used for comparison. The unaltered VTX solution recorded a pH of 6.1. Each test was stopped after the hydrogen sulfide breakthrough reached above 10 ppm.

During the second segment of the experiment the hydrogen sulfide gas was passed through the chromatography column at flow rates of either 1 or 2 standard cubic feet per hour. Solutions containing a mixture of 2 mL VTX and 748 mL distilled water and pH were modified dropwise using either a 1 percent solution of caustic soda, NaOH, or a 1 percent solution of hydrochloric acid. Solutions with a pH of 5, 5.9 (unaltered), 7, 8, and 9 respectively were tested using a constant gas flow rate of 1 Standard Cubic Feet per Hour (SCFH) and solutions with a pH of 7, 8, and 9 were tested using a gas flow rate of 2 SCFH. Hydrogen sulfide gas readings were taken every 30 seconds and experiments were concluded once the breakthrough reached 20 ppm. During pH modification the pH of each solution was monitored using a Handheld Oakton Ion 6+ Meter (Model Number WD-35613-82).

Each VTX solution was made from commercially available VTX that contains 33.055 grams (0.6 M) of iron that has been reacted with 3.56 M of methylglycinediacetate per liter, as follows:

| Solution | VTX as total Iron |
| --- | --- |
| 2 mL VTX in 750 mL solution (0.27%) | 88.15 mg/L (1.6 mM as Fe) |
| 2 mL VTX in 500 mL solution (0.40%) | 132.22 mg/L (2.4 mM as Fe) |

Data

The following Tables 2-5 show certain data gathered during this study regarding the effects of variations in pH and gas stream flow rates on the process.

TABLE 2

2.0 mL VTX Solution/Volume = 500 mL/pH = 6.1

| Flow Rate (SCFH) | 30 seconds Gas Reading (ppm) | 60 seconds Gas Reading (ppm) | 90 seconds Gas Reading (ppm) | 120 seconds Gas Reading (ppm) | 150 seconds Gas Reading (ppm) | 180 seconds Gas Reading (ppm) |
|---|---|---|---|---|---|---|
| 2 | 1 | 2 | 4 | 4 | 4 | 3 |
| 4 | 4 | 6 | 6 | 6 | 6 | 6 |
| 6 | 6 | 8 | 8 | 8 | 9 | 9 |
| 8 | 11 | — | — | — | — | — |

TABLE 3

2.0 mL VTX Solution/Volume = 500 mL/pH = 7

| Flow Rate (SCFH) | 30 seconds Gas Reading (ppm) | 60 seconds Gas Reading (ppm) | 90 seconds Gas Reading (ppm) | 120 seconds Gas Reading (ppm) | 150 seconds Gas Reading (ppm) | 180 seconds Gas Reading (ppm) |
|---|---|---|---|---|---|---|
| 2 | 0 | 0 | 0 | 0 | 0 | 0 |
| 4 | 0 | 0 | 0 | 0 | 0 | 0 |
| 6 | 0 | 0 | 0 | 0 | 0 | 0 |
| 8 | 0 | 0 | 0 | 0 | 0 | 0 |
| 10 | 0 | 0 | 0 | 0 | 0 | 0 |
| 12 | 0 | 1 | 1 | 1 | 1 | 1 |
| 14 | 2 | 3 | 4 | 6 | 6 | 7 |
| 16 | 9 | 11 | — | — | — | — |

TABLE 4

2.0 mL VTX Solution/Volume = 500 mL/pH = 8

| Flow Rate (SCFH) | 30 seconds Gas Reading (ppm) | 60 seconds Gas Reading (ppm) | 90 seconds Gas Reading (ppm) | 120 seconds Gas Reading (ppm) | 150 seconds Gas Reading (ppm) | 180 seconds Gas Reading (ppm) |
|---|---|---|---|---|---|---|
| 2 | 0 | 0 | 0 | 0 | 0 | 0 |
| 4 | 0 | 0 | 0 | 0 | 0 | 0 |
| 6 | 0 | 0 | 0 | 0 | 0 | 0 |
| 8 | 0 | 0 | 0 | 0 | 0 | 0 |
| 10 | 0 | 0 | 0 | 0 | 0 | 0 |
| 12 | 0 | 0 | 0 | 0 | 0 | 0 |
| 14 | 0 | 0 | 0 | 0 | 0 | 0 |
| 16 | 2 | 3 | 6 | 7 | 10 | — |

TABLE 5

2.0 mL VTX Solution/Volume = 500 mL/pH = 9

| Flow Rate (SCFH) | 30 seconds Gas Reading (ppm) | 60 seconds Gas Reading (ppm) | 90 seconds Gas Reading (ppm) | 120 seconds Gas Reading (ppm) | 150 seconds Gas Reading (ppm) | 180 seconds Gas Reading (ppm) |
|---|---|---|---|---|---|---|
| 2 | 0 | 0 | 0 | 0 | 0 | 0 |
| 4 | 0 | 0 | 0 | 0 | 0 | 0 |
| 6 | 0 | 0 | 0 | 0 | 0 | 0 |
| 8 | 0 | 0 | 0 | 0 | 0 | 0 |
| 10 | 0 | 0 | 0 | 0 | 0 | 0 |
| 12 | 0 | 0 | 0 | 0 | 0 | 0 |
| 14 | 0 | 0 | 0 | 0 | 0 | 0 |
| 16 | overflow | — | — | — | — | — |

Figure 4:
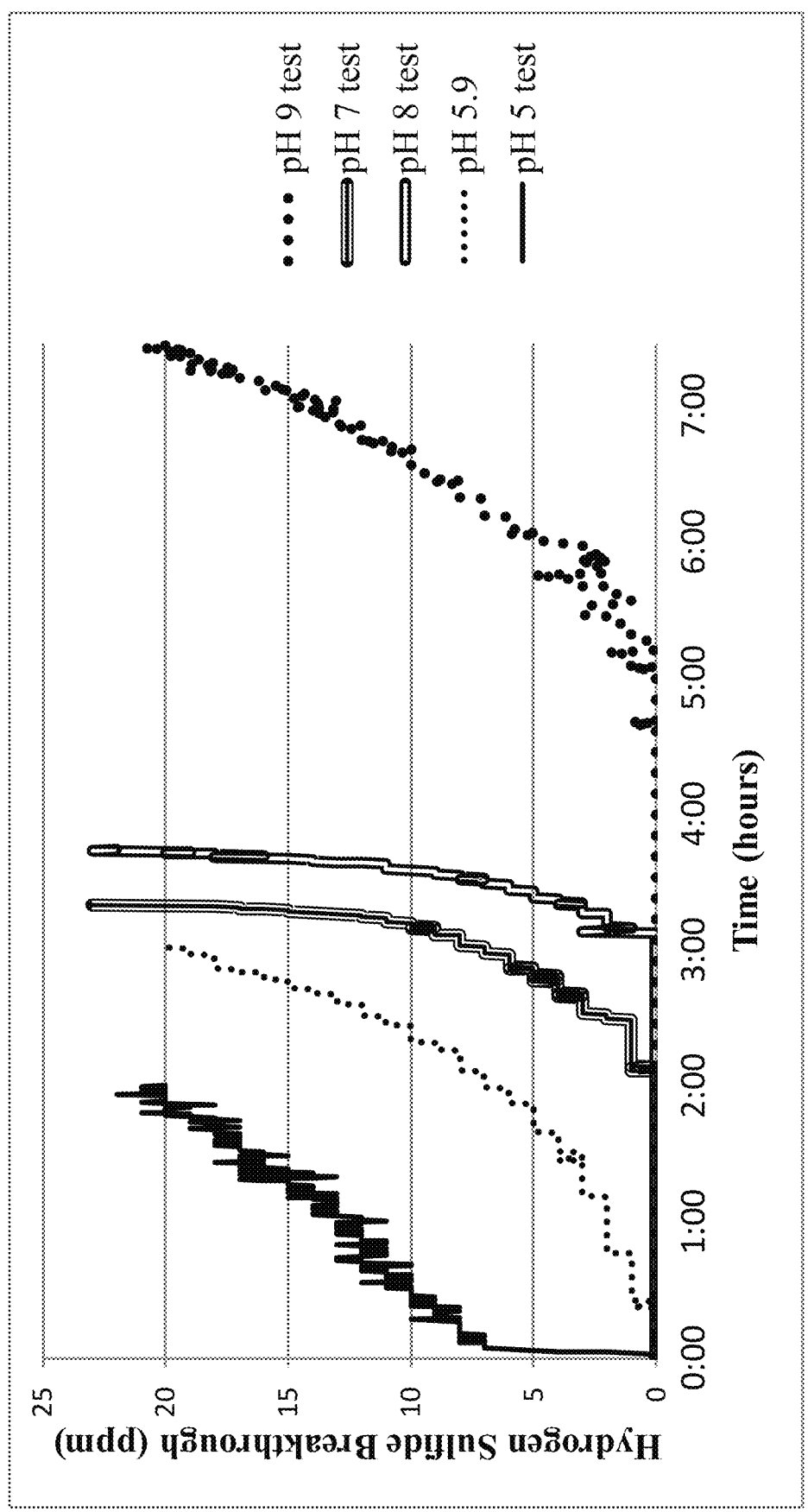
FIG. 4 is a plot of hydrogen sulfide breakthrough at various pH values in an exemplary experimental embodiment.
Figure 5:
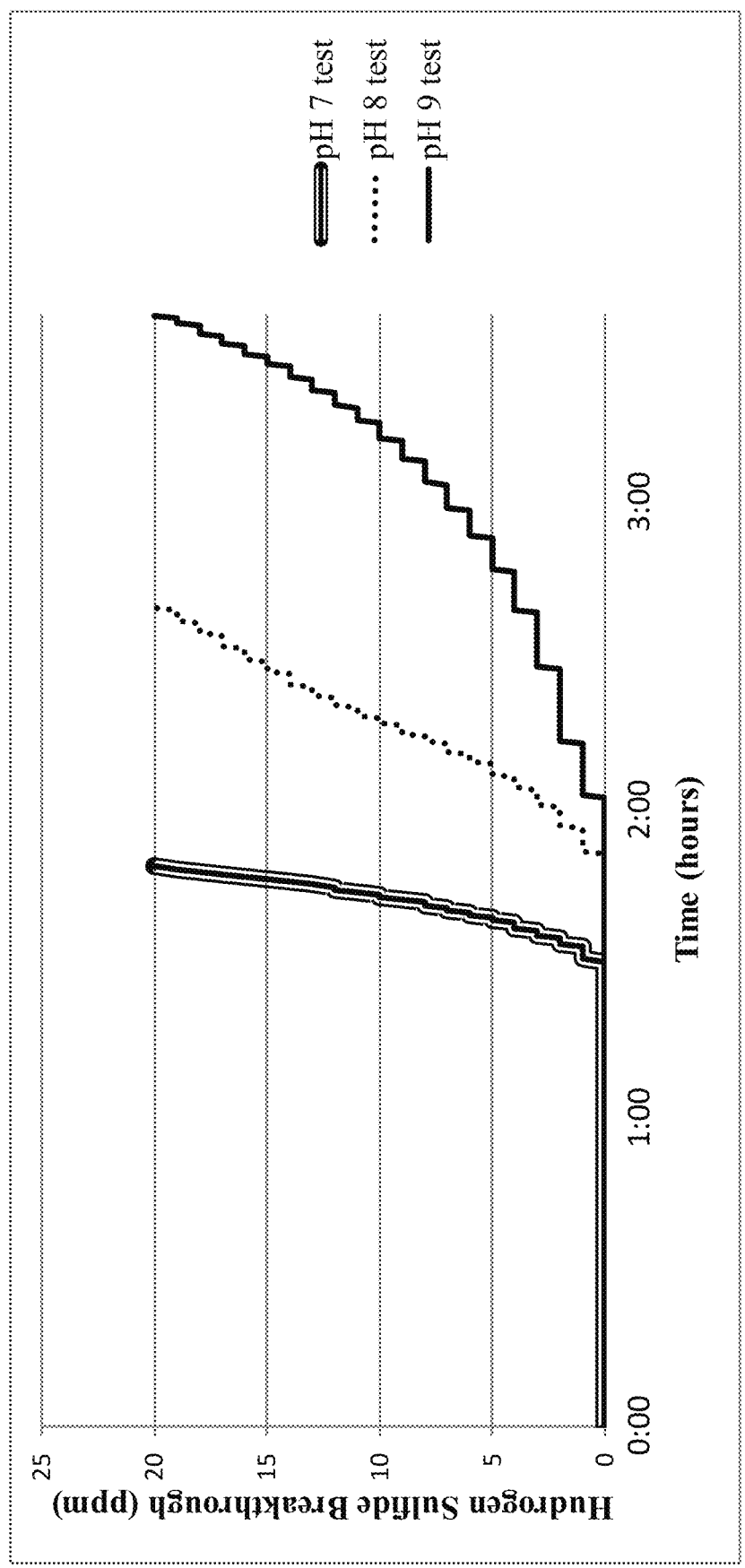
FIG. 5 is a plot of hydrogen sulfide breakthrough at various pH values in an exemplary experimental embodiment.

FIG. 4 provides a comparison between various solutions of VTX containing 2 mL VTX and 748 mL distilled water. The flow rate remained constant at 1 standard cubic feet per hour and readings were taken every 30 seconds. FIG. 5 provides a comparison between solutions of VTX containing 2 mL VTX and 748 mL distilled water. Flow rate was kept constant at 2 standard cubic feet per hour and readings were taken every 30 seconds.

The following Tables 6 and 7 show further data gathered during this study regarding the effects of changes in pH and increasing flow rates on the process.

TABLE 6

1 SCFH Flow Rate/Volume 750 mls (Reference FIG. 1)

| Solution (labeled by pH level) | Time to Initial Breakthrough (h:mm:ss) | Time to 20 ppm Breakthrough (h:mm:ss) | Amount of Hydrogen Sulfide Treated (mg) |
|---|---|---|---|
| pH 5 | 0:02:00 | 1:47:00 | 13.21 |
| pH 5.9 | 0:22:30 | 3:01:00 | 23.15 |
| pH 7 | 2:07:00 | 3:20:00 | 26.07 |
| pH 8 | 3:08:00 | 3:43:00 | 29.19 |
| pH 9 | 5:04:00 | 7:22:30 | 57.54 |

TABLE 7

2 SCFH Flow Rate/Volume 750 mls (Reference FIG. 2)

| Solution (labeled by pH level) | Time to Initial Breakthrough (h:mm:ss) | Time to 20 ppm Breakthrough (h:mm:ss) | Amount of Hydrogen Sulfide Treated (mg) |
|---|---|---|---|
| pH 7 | 1:31:30 | 1:49:30 | 28.50 |
| pH 8 | 1:52:30 | 2:40:00 | 41.38 |
| pH 9 | 2:03:30 | 3:37:00 | 56.15 |

Results and Discussion

During the first portion of the experiment, the unaltered VTX solution was significantly outperformed by the VTX solutions with higher pH levels. Breakthrough occurred immediately while using the solution with a pH of 6.1 but the pH 7 and pH 8 solutions did not allow breakthrough until the flow rates had reached 12 and 16 SCFH, respectively. Effervescence became problematic during the 9 pH solution test and testing was stopped after the solution bubbled out of the top of the column during the first minute of 16 SCFH gas flow. During this part of the experiment the solutions with an elevated pH (pH 7 and 8) were able to prevent breakthrough at gas flow rates 6 to 8 times higher than the unaltered solution with a pH of 6.1.

Increasing pH had a positive effect in preventing breakthrough during the second part of the experiment as well. The solution with a pH of 5 allowed a 20 ppm breakthrough after an hour and 47 minutes of one standard cubic feet per hour gas flow, making it the least effective solution and unfit for use in the field. The solutions with a pH of 5.9, 7, and 8 respectively recorded surprisingly similar end times, with nearly 20 minutes difference between each test. The solutions with a pH of 5.9, 7, and 8 recorded 20 ppm breakthrough times of 3 hours and 1 minute, 3 hours and 20 minutes and 3 hours and 43 minutes, respectively. The solution with a pH of 9 significantly outperformed every other solution, recording an end time of 7 hours and 22 minutes. Initial breakthrough time was vastly different between each solution, showing a pattern of a 1-2 hour increase between each solution.

When flow rate was increased to 2 SCFH it was predicted that the 20 ppm breakthrough time would be nearly half the time of the 1 SCFH flow rate tests and that the milligrams hydrogen sulfide treated would remain similar. At 1 SCFH a VTX solution with a pH level of 7 prevented 20 ppm breakthrough for 3 hours and 20 minutes while the same solution treating hydrogen sulfide at a flow rate of 2 SCFH prevented a 20 ppm breakthrough for 1 hour and 49 minutes. In this case the prediction was nearly correct, showing the linear relationship between flow rate and time until breakthrough. Comparing the solutions with a pH of 8 at both flow rates reveals an hour difference between the breakthrough times. The time until 20 ppm breakthrough not only increased, but approximately doubled, from 3 hours and 37 minutes to 7 hours and 22 minutes, when the flow rate was doubled during the 9 pH solution tests. From a pH perspective, during the 2 SCFH flow rate tests the 20 ppm breakthrough times increased by nearly 1 hour as pH increased 1 unit.

During the 1 SCFH experiment, the solutions with a pH of 5.9, 7, and 8 treated 23.15, 26.07, and 29.19 mg of hydrogen sulfide, respectively. The 9 pH solution treated 57.54 mg hydrogen sulfide, nearly double that of the pH 8 solution. The ratio of sulfide removed versus iron available on a milli-Mole basis was as follows:

TABLE 8

| Removal Efficiency of Sulfide by Variable pH, as mM Sulfide:mM Iron | | | |
|---|---|---|---|
| pH | mM Sulfide Removed | mM Iron Available | mM Ratio S:Fe |
| 5.0 | 0.41 | 1.80 | 0.23 |
| 5.9 | 0.72 | 1.80 | 0.40 |
| 7.0 | 0.81 | 1.80 | 0.45 |
| 8.0 | 0.91 | 1.80 | 0.51 |
| 9.0 | 1.79 | 1.80 | 0.99 |

Numbers were similar during the 2 SCFH tests. The pH 7 solution treated 28.5 mg hydrogen sulfide and the pH 8 solution treated 41.38 mg. The pH 9 solution was able to treat 56.15 mg hydrogen sulfide.

Assuming that the highest flow rate tested of 200 ppm hydrogen sulfide gas at 16 SCFH could be used for estimating the surface area of a larger pilot system in the field, the following parameters were calculated:

Column surface area for lab test (5.0 cm diameter column)=19.64 $cm^2$

Flow Rate Tested=16 standard cubic feet per hour equals 7.55 liters per minute or 0.383 liters/minute/centimeter square of surface area Assume a pilot scale tank at 4.0 feet diameter Area in centimeters squared of 4.0 foot (122 cm) diameter tank=11,677.4 $cm^2$ surface area resulting in a potential flow of hydrogen sulfide-containing air of 158 cubic feet per minute through the column of proportional surface area.

Conclusions

The VTX solutions with the highest pH level outperformed the solutions with no pH modification. Results from the first portion of the experiment reveal that the pH 7 and pH 8 solutions were able to prevent breakthrough at flow rates 6 to 8 times higher than that of the unaltered solution (pH 6.1). It was suspected that the pH 9 solution might outperform all other solutions, however, overflow occurred before comparison could be made. Solutions with an elevated pH were able to better prevent breakthrough and treat higher mass of hydrogen sulfide while gas flow was kept constant. The pH 9 solution was the most efficient, by far, nearly doubling the final breakthrough times of the pH 5.9, 7, and 8 solutions, respectively, during the 1 SCFH flow rate trial. It was apparent that raising the pH above 8 greatly increases the amount of highly reactive hydrogen sulfide ($HS^-$) and sulfide ions ($S^{2-}$). Through the use of pH elevation, VTX solutions could create a more desirable environment for hydrogen sulfide sequestration.

It was clear from Tables 6 and 7 that elevating pH resulted in significant improvement in efficiency of the VTX for removing hydrogen sulfide gas from the dirty gas stream. A comparison of millimoles of sulfide removed versus available iron content for each pH solution tested revealed that the process improvement took a major jump between the circum-neutral pHs of 6 to 8 and the higher pH of 9.0. Results at pH 9.0 were essentially double that of those in the circum-neutral range (e.g., pH 6 to 8). Further, prior to failure of the column due to breakthrough, sulfide sequestration mirrored the available molecules of available iron almost exactly. This suggested that a pH of 9.0 might be near or precisely the optimum point to target for process efficiency.

It is important to note that this experiment was carried out under anaerobic conditions. Therefore, failure points for each condition represented a saturation of sulfur sequestration for selected pH's for each selected concentration of VTX catalyst added. Additional experimentation under aerobic conditions might reveal whether reactivation of the VTX catalyst occurs as the VTX sequesters sulfide entering the column. It is suspected that introduction and/or utilization of atmospheric oxygen will result in ongoing reactivation of the chelate(s) so that they can sequester additional sulfide. This would greatly improve the economies for this process.

The Effect of Solution Oxygenation on VTX Catalyst Efficiency

Purpose

This experiment was designed to determine if hydrogen sulfide gas diffused through VTX catalyst along with atmospheric oxygen resulted in a continuation of the efficient capture of hydrogen sulfide by VTX as demonstrated under anaerobic conditions. Finally, if efficient capture of hydrogen sulfide occurred within an aerobic environment, this experiment might help determine whether the presence of oxygen would result in the oxidation of the captured sulfide to elemental sulfur and subsequent release of that sulfur and reactivation of the VTX to capture additional hydrogen sulfide. It is surmised from early testing that the oxidation of VTX molecules that had sequestered sulfide, using atmospheric air and/or substantially pure oxygen, resulted in a break in the bond between the iron in VTX and the sulfur from the hydrogen sulfide gas. It also appeared that once the bond was broken through oxidation, the sulfur reverted to insoluble elemental sulfur that could be removed via filtration. If properly oxidized and under the right conditions (i.e. flow rate, temperature, pH, etc.), VTX catalyst might theoretically be able to treat an endless amount of hydrogen sulfide gas within constraints dictated by contact of VTX catalyst and hydrogen sulfide in a vessel, such as through a commonly available bubble tower or a scrubber tower.

In this context, bubble towers can operate by simply diffusing, through fine bubble diffusers, hydrogen sulfide contaminated gas up through a column of treatment chemicals. Scrubber towers can operate by recirculating the treatment chemicals from a sump to the top of a column filled with high surface area media. The treatment chemicals then can be sprayed down over the media on an intermittent and/or continuous basis to enhance contact between the treatment chemicals and the contaminated gas that is fed from the bottom of the scrubber up through the media. Design concerns for the VTX treatment method included demonstrating adequate contact time and flow rates of contaminated gas through the column to allow for capture and subsequent oxidation of sequestered sulfide.

Methods

Two hundred (200) ppm (278.94 $mg/m^3$) hydrogen sulfide gas, mixed with nitrogen gas as a carrier, was passed from a pressurized tank through a Key Instruments Gas Flow Indicator (Model Number MR3A04BVBN) into a 1 liter Ace Glass Incorporated chromatography column (Model Number 5889-40) containing various volumes of VTX solution. The variety of volumes of VTX solution were used to better understand the effect of solution height on contact time between VTX catalyst and hydrogen sulfide. The pressurized tank was ordered from Custom Gas Solutions and contained a 1000 liter, 2000 PSIG mixture of 200 ppm $H_2S$ gas and a balance of nitrogen gas. The chromatography column contained a fritted disk with a porosity of 70-100 microns and a stopcock to control gas flow. The column had an inner diameter of 50 mm and measured 610 mm from the top of the fritted glass disk to the top of the column. Clear plastic tubing connected the tank to the flow indicator and the chromatography column.

Hydrogen sulfide gas was allowed to pass through the chromatography column at a constant flow rate of two standard cubic feet per hour (SCFH) for 24 hours. A cylindrical fine bubble diffuser, connected to an atmospheric oxygen pump, was placed at the bottom of the column for the first 8 hours and 16 minutes of the experiment. After 8 hours and 16 minutes the bubble diffuser was placed at the middle of the column, 305 mm from the top of the fritted glass disk. The diffuser's position was changed to determine a correct placement for the bubble diffuser. Oxygen flow rate was kept constant, however the gas flow meter used did not have measurements listed. Oxygen bubbling was kept to a minimum to prevent disruption of contact between VTX and hydrogen sulfide.

The solution under examination contained 2 mL of VTX catalyst and 748 mL distilled water. A one percent solution of caustic soda was used to modify the solution's pH to 8, as this pH level has shown to be more efficient than an unaltered VTX solution, which normally has a pH around 6. A handheld Oakton Ion 6+ Meter (Model Number WD-35613-82) was used to monitor the solution's pH as it was modified.

A Detection Instruments OdaLog Type L2 $H_2S$ Gas Meter (Model Number SL-H2S-1000, Serial Number 08406489) was placed on top of the column to record instantaneous gas levels, in parts per million. Readings were taken every 30 seconds and testing was concluded after 24 hours.

Data

Figure 6:
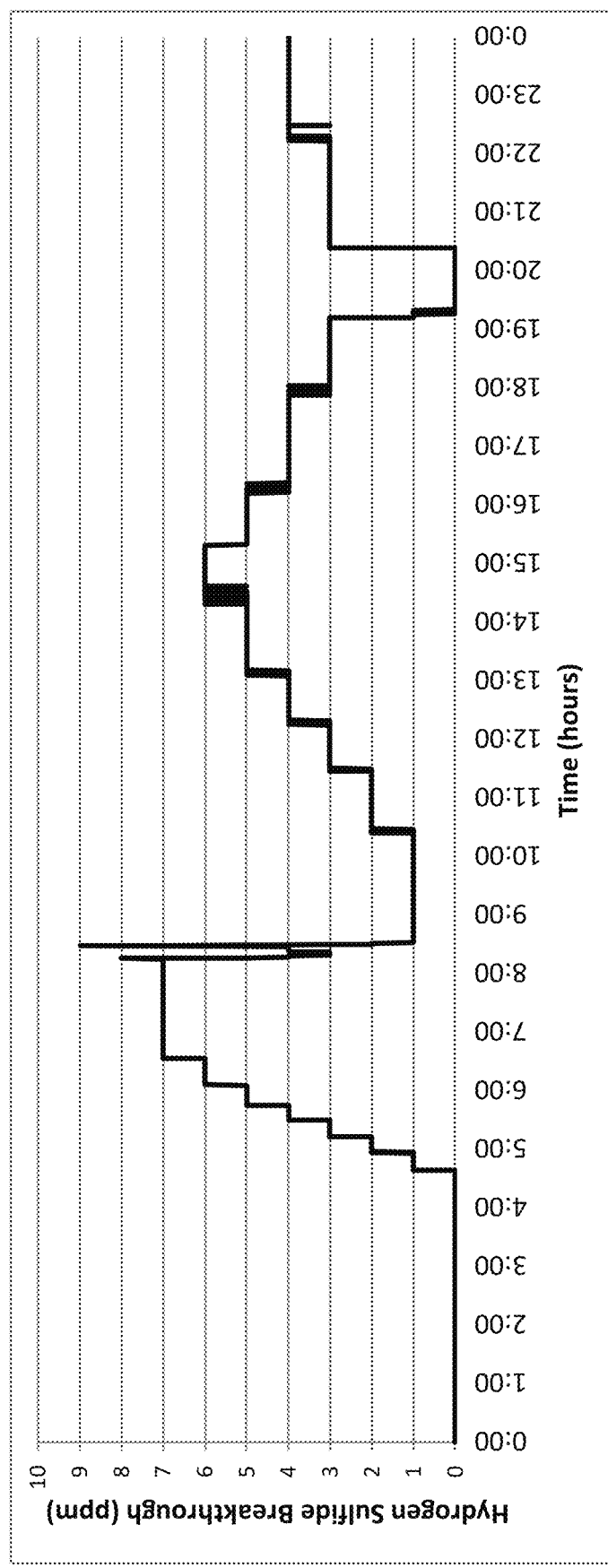
FIG. 6 is a plot of hydrogen sulfide breakthrough versus time in an exemplary experimental embodiment.

FIG. 6 provides measurements of hydrogen sulfide breakthrough (ppm) over a period of 24 hours. The VTX solution used contained 2 mL VTX and 748 mL water (1.6 mM VTX as Fe). Solution pH was initially 8. Feed hydrogen sulfide gas (200 ppm) was fed at 2 SCFH. Table 9 below presents the total amount of untreated hydrogen sulfide (mass), treated hydrogen sulfide, and the total amount of hydrogen sulfide passed through the chromatography column throughout the course of the experiment.

| Hydrogen Sulfide Treated (mg) | Hydrogen Sulfide Escaping Treatment (mg) | Total Hydrogen Sulfide Flow (mg) |
|---|---|---|
| 373.4 (11.7 mM) | 5.5 | 378.9 |

Results and Discussion

Throughout the entirety of the 24 hour test, the VTX solution allowed a peak breakthrough of only 9 ppm. A 10 ppm breakthrough was considered failure, however a peak of 9 revealed that improvements could be made to the process. Around the 4 and a half hour marker the solution began to show initial breakthrough, quickly rising to a 9 ppm breakthrough over the course of about a 4 hour period. This breakthrough dropped immediately after the fine bubble diffuser was placed at the midway point of the column. Breakthrough decreased to 1 ppm for an hour and half before rising again to a 6 ppm leak. An hour of 0 ppm breakthrough occurred after the nineteenth hour of testing, supporting the idea that bubble oxygenation was preventing solution saturation. If the solution had been saturated, the ppm breakthrough would rise well beyond 10.

Throughout the course of the test 378.9 mg of hydrogen sulfide were passed through the chromatography column. Of those 378.9 mg, the solution treated 373.4 mg (98.5%) of hydrogen sulfide. Only 5.5 mg were allowed to pass through untreated. The 373.4 mg of sulfide is 11.7 mM of sulfur. The fact that only 1.6 mM of VTX as iron was within the column was a strong indication that sulfide was likely being captured and then released as elemental sulfur in the presence of oxygen. The 11.7 mM of sulfide treated was accomplished with 1.6 mM of VTX as iron or 7.3 times the theoretical saturation capacity of the iron on the VTX molecule to sequester sulfide. Further, it was rather clear that a reactivation of the VTX was occurring when the sulfide came off as elemental sulfur. Also, the color of the treatment column liquid went progressively from a clear slightly brownish color (VTX typically imparts this color) to a milky light yellow color that imparted lots of turbidity to the liquid as time progressed, which was a further indication of elemental sulfur production.

Conclusion

Oxygenation using a bubbling system of atmospheric oxygen can be used as an alternate form of oxidation in VTX field solutions. Testing revealed that placing the bubbler at the midpoint of the solution can prevent disruption of VTX and $H_2S$ contact, however correct placement might change in different tank systems. It can be important that the correct oxygen flow rate is found so that bubbling does not create areas where hydrogen sulfide gas can escape without contact with the treatment chemicals.

The data strongly suggested that the VTX catalyst efficiently sequestered hydrogen sulfide as it was sparged through the test column. The data also strongly suggested that atmospheric oxygen reacted with the sulfide sequestered by the iron within the VTX catalyst to form elemental sulfur under aerobic conditions.

The data strongly supported the notion that the VTX catalyst regained its ability to sequester hydrogen sulfide for further release as elemental sulfur within an aerobic environment for 7.3 theoretical saturation cycles for the iron available for sequestration.

When operating on a test vessel containing 1.6 mM of VTX catalyst as iron, the process removed 98.5% of hydrogen sulfide test gas at 200 ppm when fed through a 50 mm diameter test column with 750 milliliters of treatment solution (~450 mm depth) at a constant 2 SCFH for 24 hours. Sequestration of sulfide was still proceeding when the experiment was stopped suggesting that the VTX catalyst could go through further cycles.

Volume Driven Hydrogen Sulfide Gas Breakthrough Experiment

Purpose

This experiment was designed to determine the breakthrough flow rate at which mixed hydrogen sulfide and nitrogen gas being passed through a fine bubble diffuser into a column of liquid VTX catalyst resulted in significant hydrogen sulfide gas escaping capture (i.e., the VTX approach began to fail). Contact between molecules of VTX and hydrogen sulfide gas can be necessary to allow the iron within the VTX molecule to bond to the sulfur in hydrogen sulfide. Certain flow rates and solution volumes bubbles created by the gas flow could potentially create areas where hydrogen sulfide gas could flow through without coming into contact with the catalyst. As a result, after some time, the solution of VTX could become increasingly saturated, resulting in fewer contact points and thus allowing $H_2S$ to slip through untreated.

Methods

Two hundred (200) ppm (278.94 mg/m$^3$) hydrogen sulfide gas, mixed with nitrogen gas as a carrier, was passed from a pressurized tank through a Key Instruments Gas Flow Indicator (Model Number MR3A04BVBN) into a 1 liter Ace Glass Incorporated chromatography column (Model Number 5889-40) containing various volumes of VTX solution. Different volumes were used to better understand the effect of solution height on contact time between VTX catalyst and hydrogen sulfide. The pressurized tank was ordered from Custom Gas Solutions and contained a 1000 liter, 2000 PSIG mixture of 200 ppm $H_2S$ gas and a balance of nitrogen gas. The chromatography column contained a fritted disk with a porosity of 70-100 microns and a stopcock to control gas flow. The column had an inner diameter of 50 mm and measured 610 mm from the top of the fritted glass disk to the top of the column. Clear plastic tubing connected the tank to the flow indicator and the chromatography column.

The hydrogen sulfide gas was passed through the chromatography column at flow rates ranging from 2 standard cubic feet per hour to 22 standard cubic feet per hour. During the breakthrough experiments flow rates were continuously increased in increments of 2 scfh every 3 minutes and $H_2S$ gas readings were taken every minute. A Detection Instruments OdaLog Type L2 $H_2S$ Gas Meter (Model Number SL-H2S-1000, Serial Number 08406489) was placed on top of the column to record instantaneous gas levels in parts per million.

Breakthrough tests were completed with 100 percent, 22 percent, 10 percent, and 1 percent VTX dilutions of the most concentrated solution. The percentages utilized reflected the active iron percentage for the batch of Ferric MGDA formulated for this experiment. Active iron concentration can vary by approximately 30% depending on the formulation of the base ingredients used to manufacture the Ferric MGDA. Variability in the actual concentration of active iron can be dependent on the variable concentration of raw ingredients (ferric chloride and sodium MGDA) received from the manufacturers of those chemicals. As noted in the table below, the 100% active Fe MGDA solution for this test was confirmed by Environmental Compliance Lab in Ashland, Va. to contain 33,055.06 mg/l of active iron. One hundred percent VTX solution tests were completed with volumes of 10 mL, 25 mL, and 50 mL. Twenty two percent VTX solution tests were completed with volumes of 10 mL, 25 mL, 50 mL, and 100 mL. Ten percent VTX solution tests were completed with volumes of 10 mL, 50 mL, 100 mL, and 250 mL. One percent VTX solution tests were completed with volumes of 100 mL, 250 mL, and 500 mL.

The iron concentration within the VTX solution for each of the tests was tested to be as follows:

| Concentration of Active Iron | |
|---|---|
| Percent VTX Concentration | Concentration of active iron within each test solution |
| 1% | 330.55 mg/L |
| 10% | 3,305.50 mg/L |
| 22% | 7272.11 mg/L |
| 100% | 33,055.06 mg/L |

Data

One Percent VTX Solutions

TABLE 10

100 mL 1 percent VTX solution breakthrough test.
Solution height was recorded at 61 mm.
100 mL 1% VTX Solution/Height = 61 mm

| SCFH | Minute 1 | Minute 2 | Minute 3 |
|---|---|---|---|
| 2 | 6 | 10 | 12 |
| 4 | 21 | 27 | 30 |

TABLE 11

250 mL 1 percent VTX solution breakthrough test.
Solution height was recorded at 131 mm.
250 mL 1% VTX Solution/Height = 131 mm

| SCFH | Minute 1 | Minute 2 | Minute 3 |
|---|---|---|---|
| 2 | 3 | 3 | 4 |
| 4 | 5 | 9 | 10 |
| 6 | 14 | 17 | 19 |

TABLE 12

500 mL 1 percent VTX solution breakthrough test.
Solution height was recorded at 265 mm.
500 mL 1% VTX Solution/Height = 265 mm

| SCFH | Minute 1 | Minute 2 | Minute 3 |
|---|---|---|---|
| 2 | 0 | 0 | 0 |
| 4 | 1 | 1 | 2 |
| 6 | 3 | 3 | 4 |
| 8 | 5 | 5 | 6 |

Ten Percent VTX Solutions

TABLE 13

10 mL 10 percent VTX solution breakthrough test.
Solution height was recorded at 9 mm.
10 mL 10% VTX Solution/Height = 9 mm

| SCFH | Minute 1 | Minute 2 | Minute 3 |
|---|---|---|---|
| 2 | 4 | 5 | 9 |
| 4 | 25 | 33 | 36 |

TABLE 14

50 mL 10 percent VTX solution breakthrough test.
Solution height was recorded at 30 mm.
50 mL 10% VTX Solution/Height = 30 mm

| SCFH | Minute 1 | Minute 2 | Minute 3 |
|---|---|---|---|
| 2 | 0 | 0 | 0 |
| 4 | 0 | 0 | 0 |
| 6 | 1 | 2 | 6 |
| 8 | 14 | 16 | 17 |

TABLE 15

100 mL 10 percent VTX soution breakthrough test.
Solution height was recorded at 61 mm.
100 mL 10% VTX Solution/Height = 61 mm

| SCFH | Minute 1 | Minute 2 | Minute 3 |
|---|---|---|---|
| 2 | 0 | 0 | 0 |
| 4 | 0 | 0 | 0 |
| 6 | 0 | 0 | 0 |
| 8 | 0 | 0 | 3 |
| 10 | 6 | 7 | 7 |
| 12 | 9 | 10 | 10 |

TABLE 16

250 mL 10 percent VTX solution breakthrough test.
Solution height was recorded at 131 mm.
250 mL 10% VTX Solution/Height = 131 mm

| SCFH | Minute 1 | Minute 2 | Minute 3 |
|---|---|---|---|
| 2 | 0 | 0 | 0 |
| 4 | 0 | 0 | 0 |
| 6 | 0 | 0 | 0 |
| 8 | 0 | 0 | 0 |
| 10 | 0 | 0 | 0 |
| 12 | overflow | — | — |

Twenty Two Percent VTX Solutions

TABLE 17

10 mL 22 percent VTX solution breakthrough test.
Solution height was recorded at 9 mm.
10 mL 22% VTX Solution/Height = 9 mm

| SCFH | Minute 1 Gas Reading (ppm) | Minute 2 Gas Reading (ppm) | Minute 3 Gas Reading (ppm) |
|---|---|---|---|
| 2 | 2 | 3 | 2 |
| 4 | 3 | 6 | 17 |
| 6 | 28 | 33 | 37 |

TABLE 18

25 mL 22 percent VTX solution breakthrough test.
Solution height was recorded at 16 mm.
25 mL 22% VTX Solution/Height = 16 mm

| SCFH | Minute 1 Gas Reading (ppm) | Minute 2 Gas Reading (ppm) | Minute 3 Gas Reading (ppm) |
|---|---|---|---|
| 2 | 2 | 1 | 1 |
| 4 | 0 | 0 | 0 |
| 6 | 1 | 5 | 9 |

TABLE 18-continued 25 mL 22 percent VTX solution breakthrough test.
Solution height was recorded at 16 mm.
25 mL 22% VTX Solution/Height = 16 mm

| SCFH | Minute 1 Gas Reading (ppm) | Minute 2 Gas Reading (ppm) | Minute 3 Gas Reading (ppm) |
|---|---|---|---|
| 8 | 15 | 17 | 18 |
| 10 | 23 | 25 | 26 |

TABLE 19

50 mL 22 percent VTX solution breakthrough test.
Solution height was recorded at 30 mm.
50 mL 22% VTX Solution/Height = 30 mm

| SCFH | Minute 1 Gas Reading (ppm) | Minute 2 Gas Reading (ppm) | Minute 3 Gas Reading (ppm) |
|---|---|---|---|
| 2 | 1 | 3 | 2 |
| 4 | 0 | 0 | 0 |
| 6 | 0 | 0 | 0 |
| 8 | 0 | 0 | 0 |
| 10 | 0 | 1 | 2 |
| 12 | 7 | 9 | 12 |
| 14 | 15 | 16 | 16 |

TABLE 20

100 mL 22 percent VTX solution breakthrough test.
Solution height was recorded at 57 mm.
100 mL 22% VTX Solution/H = 57 mm

| SCFH | Minute 1 Gas Reading (ppm) | Minute 2 Gas Reading (ppm) | Minute 3 Gas Reading (ppm) |
|---|---|---|---|
| 2 | 0 | 0 | 0 |
| 4 | 0 | 0 | 0 |
| 6 | 0 | 0 | 0 |
| 8 | 0 | 0 | 0 |
| 10 | 0 | 0 | 0 |
| 12 | overflow | — | — |

One Hundred Percent VTX Solutions

TABLE 21

10 mL 100 percent VTX solution breakthrough test.
Solution height was recorded at 9 mm.
10 mL 100% VTX Solution/Height = 9 mm

| SCFH | Minute 1 Gas Reading (ppm) | Minute 2 Gas Reading (ppm) | Minute 3 Gas Reading (ppm) |
|---|---|---|---|
| 2 | 0 | 0 | 0 |
| 4 | 0 | 1 | 0 |
| 6 | 4 | 4 | 4 |
| 8 | 11 | 11 | 13 |
| 10 | 25 | 34 | 39 |

TABLE 22

25 mL 100 percent VTX solution breakthrough test.
Solution height was recorded at 17 mm.
25 mL 100% VTX Solution/Height = 17 mm

| SCFH | Minute 1 Gas Reading (ppm) | Minute 2 Gas Reading (ppm) | Minute 3 Gas Reading (ppm) |
|---|---|---|---|
| 2 | 0 | 0 | 0 |
| 4 | 0 | 0 | 0 |
| 6 | 3 | 4 | 4 |
| 8 | 7 | 8 | 8 |

TABLE 23

50 mL 100 percent VTX solution breakthrough test.
Solution height was recorded at 31 mm.
50 mL 100% VTX Solution/Height = 31 mm

| SCFH | Minute 1 Gas Reading (ppm) | Minute 2 Gas Reading (ppm) | Minute 3 Gas Reading (ppm) |
|---|---|---|---|
| 2 | 0 | 0 | 0 |
| 4 | 0 | 0 | 0 |
| 6 | 0 | 0 | 0 |
| 8 | overflow | — | — |

Results and Discussion

As expected, the solutions containing the higher concentrations of VTX concentrate and, therefore, active iron, were the most efficient in preventing breakthrough. Diluting the compound decreased reactivity and effervescence and low solution volumes decreased contact time between hydrogen sulfide and VTX catalyst. Effervescence became problematic with greater concentrations of VTX making the study impossible to perform under such conditions.

Initial breakthrough was observed in the 10 mL solution of 100 percent VTX at a flow rate of 4 scfh. Approximately 1 ppm $H_2S$ gas escaped the column without treatment during the second minute of flow at 4 scfh, and this number increased to a 4 ppm breakthrough when flow rate was increased to 6 scfh. A mere 9 mm solution height did not provide an adequate contact time between the hydrogen sulfide gas and VTX. The 22 percent and 10 percent 10 mL solutions failed at flow rates of 2 scfh. OdaLog gas readings quickly reached almost 40 ppm during a flow of 4 scfh for the 10 percent solution and a flow of 6 scfh for the 22 percent solution. The combination of low concentrations of VTX and short solution height allowed plenty of space for hydrogen sulfide gas to pass through the column without molecular contact with the catalyst. Increasing flow rates beyond 10 scfh for any of the 10 mL solutions likely would have resulted in a major leakage of untreated hydrogen sulfide.

Two 25 mL solutions were tested, one containing 100 percent VTX and the other containing 22 percent VTX. These two solutions performed very similarly with one significant difference. The 22 percent 25 mL solution allowed a 1-2 ppm breakthrough during the first three minutes of the 2 scfh flow rate, however upon increasing the flow rate to 4 scfh the breakthrough stopped for 3 minutes. Increasing the flow to 6 scfh resulted in a 1 ppm breakthrough that continuously increased as time went on. The initial breakthrough occurred due to a low solution height. Increasing the flow to 4 scfh elevated the solution height to 75 mm because of the bubbling caused by the reaction. This bubbling increased contact surface area between hydrogen sulfide gas bubbles and the VTX solution. Smaller bubbles were more effective. At 6 scfh the bubbling reached 115 mm of column height but breakthrough still occurred due to the large size of the bubbles as compared to smaller bubbles with less flow. The bubbling created by the reaction between the catalyst and hydrogen sulfide gas apparently aided in creating contact only if the bubbles were of a certain size. Fine bubbles diffusion can be preferred for a bubble tower type scrubber.

Three separate 50 mL solution tests were completed with 100 percent, 22 percent, and 10 percent VTX concentrations. The 100 percent 50 mL solution test was stopped to avoid overflow during the first minute of the 8 scfh flow rate. High reactivity between the 50 mL of pure catalyst and the hydrogen sulfide gas created a column of effervescence and bubbles that reached the top of the column. The 22 percent 50 mL solution clearly outperformed the 10 percent 50 mL solution, allowing breakthrough during the second minute of 10 scfh gas flow. In comparison, the 10 percent solution allowed breakthrough during the first minute of 6 scfh. Between the two 50 mL solutions there was only a difference of 6 mL VTX. An increase in 6 mL VTX allowed the 22 percent solution to prevent breakthrough up to a flow rate 4 scfh higher than the 10 percent 50 mL solution.

Three 100 mL solution were tested with concentrations of 22 percent, 10 percent, and 1 percent VTX. The 22 mL in the 22 percent solutions proved to be too reactive for the column to handle and the test was cut short during the first minute of gas flow at 12 scfh. Breakthrough had not occurred before the overflow point. A 3 ppm breakthrough was recorded during the 3 minutes of 8 scfh gas flow. The 22 percent 50 mL solution and the 10 percent 100 mL solution performed similarly, with the 22 percent 50 mL solution allowing breakthrough at a flow rate only 2 scfh higher. The 1 percent 100 mL solution allowed breakthrough immediately at the start of the test, reaching a 30 ppm leakage after the third minute of 4 scfh gas flow. The 100 mL solution did not contain enough catalyst to effectively react with all of the hydrogen sulfide gas.

Ten percent and 1 percent 250 mL solutions were tested. Passing hydrogen sulfide gas through the 10 percent solution resulted in overflow after the first minute of 12 scfh overflow. No breakthrough had occurred before this point. The 1 percent solution failed almost immediately, allowing a 3 ppm breakthrough after the first minute of testing. Overall, the 1 percent solutions were not efficient in preventing a breakthrough. Even the 1 percent 500 mL solution allowed a breakthrough after the first minute of 4 scfh gas flow.

Observation of success for the various concentrations of VTX and column depth indicated that a maximum of 10 SCFH (4.7 liters/minute) of contaminated gas flow could be sparged through a column with 100 milliliters of 22% VTX catalyst and column dimensions approximating 50 mm diameter and 57 mm of depth. The 22% VTX solution equated to an approximate molar concentration of VTX, as iron, of 0.132 M or 7.3 grams of iron per liter of VTX as a starting point. So, it appears that a conservative design guide can be created with this data in mind.

Conclusions

It was predicted that the solutions containing higher percentages of VTX would be more efficient in treating hydrogen sulfide gas, thus preventing a point of untreated gas breakthrough. The results of this experiment validated this prediction, proving that the 100 percent and 22 percent solutions outperformed the 10 percent and 1 percent solutions. Increased concentrations of VTX concentrate provided more contact time between the hydrogen sulfide gas and catalyst. However, increased effervescence became an issue as the concentration of VTX increased. The increases in effervescence not only elevated the solution height within the column, but also increased mixing.

In addition to concentration, solution depth was also predicted to have a role in efficiency of hydrogen sulfide treatment. The results revealed that higher volume solutions containing the same percentage of catalyst prevented breakthrough at higher flow rates. However, this was hardly true for the 1 percent solutions (i.e., equal to or less than 10 mM of VTX as iron). Neither concentration nor volume was found to be a more important factor. Instead, both the concentration of VTX and the depth of the solution within the container played roles in creating more contact time between hydrogen sulfide gas and active iron within the catalyst.

It was apparent that a concentration of VTX from 10 percent to 22 percent active VTX was most desirable for process control and efficiency under the conditions of these tests. Process control at 100 percent VTX concentration was not practical under conditions of the tests due to intense effervescence.

While lesser concentrations of VTX could be considered effective, these test results suggest that a concentration for full scale units generally should be approximately 22% VTX as diluted from full strength VTX. The data suggests That concentrations less than 22% will simply need larger volume and depth of treatment chemicals to be successful. Foaming can be an issue for more concentrated VTX above approximately 22% at gas flow rates exceeding 4.7 liters/minute/100 milliliters 22% VTX.

Pilot Study

Purpose

A wet well was releasing hydrogen sulfide into the atmosphere causing odor issues in an adjoining neighborhood. It was hypothesized that laboratory implementations of the VTX treatment process could be adapted to effectively treat the offending hydrogen sulfide.

System and Method

A 4" PVC vent pipe was installed in the wet well as an extraction point for the air within the wet well. The wet well was already equipped with a 6" vent for air exchange that was responsible for venting H2S laden air into the atmosphere surrounding the wet well. The 4" vent pipe was plumbed to an RB3-101-3 regenerative blower from All-Star Products, Inc., of 2095 Exeter Lane, Memphis, Tenn. This blower was designed to move air at 105 cubic feet per minute, however, actual air removal was determined to be 95 cubic feet per minute when the blower pulled air from the wet well and vented directly to the atmosphere. Once connected to the diffusing system within a VTX catalyst-based treatment system, the flow was registered at 74 standard cubic feet per minute. A model 6200 In-line Flowmeter (from CDI of 3R Green Street, Woburn, Mass.) was used to monitor air flow. The hydrogen sulfide contaminated air exhausted from the blower was plumbed to deliver the air to a 500 gallon VTX-containing "bubble tower" treatment tank. A 1½" line coming from the exhaust side of the blower was plumbed to a PVC distribution manifold located at the bottom of the treatment tank. This system was designed to evenly distribute contaminated air from the regenerative blower through three hundred and seven 5/32" holes drilled evenly into the PVC distribution manifold, from which small bubbles would move up through the VTX catalyst. Before adding VTX, the treatment tank was packed with commonly available 4" plastic media (i.e. column packing) to slow the rise of the bubbles to the top surface of the VTX catalyst. Two hundred and fifty gallons of 22% VTX catalyst was then pumped into the treatment tank. The pH of the VTX was adjusted to approximately 8.0 to mimic conditions within lab studies noting higher efficiency at elevated pH. Contact time calculated for the flow of hydrogen sulfide contaminated air through the VTX catalyst and media was estimated to be approximately 3.7 seconds based on the rise in tank volume due to volume displacement imparted by rising bubbles coming in at 74 standard cubic feet per minute.

Results

Figure 10:
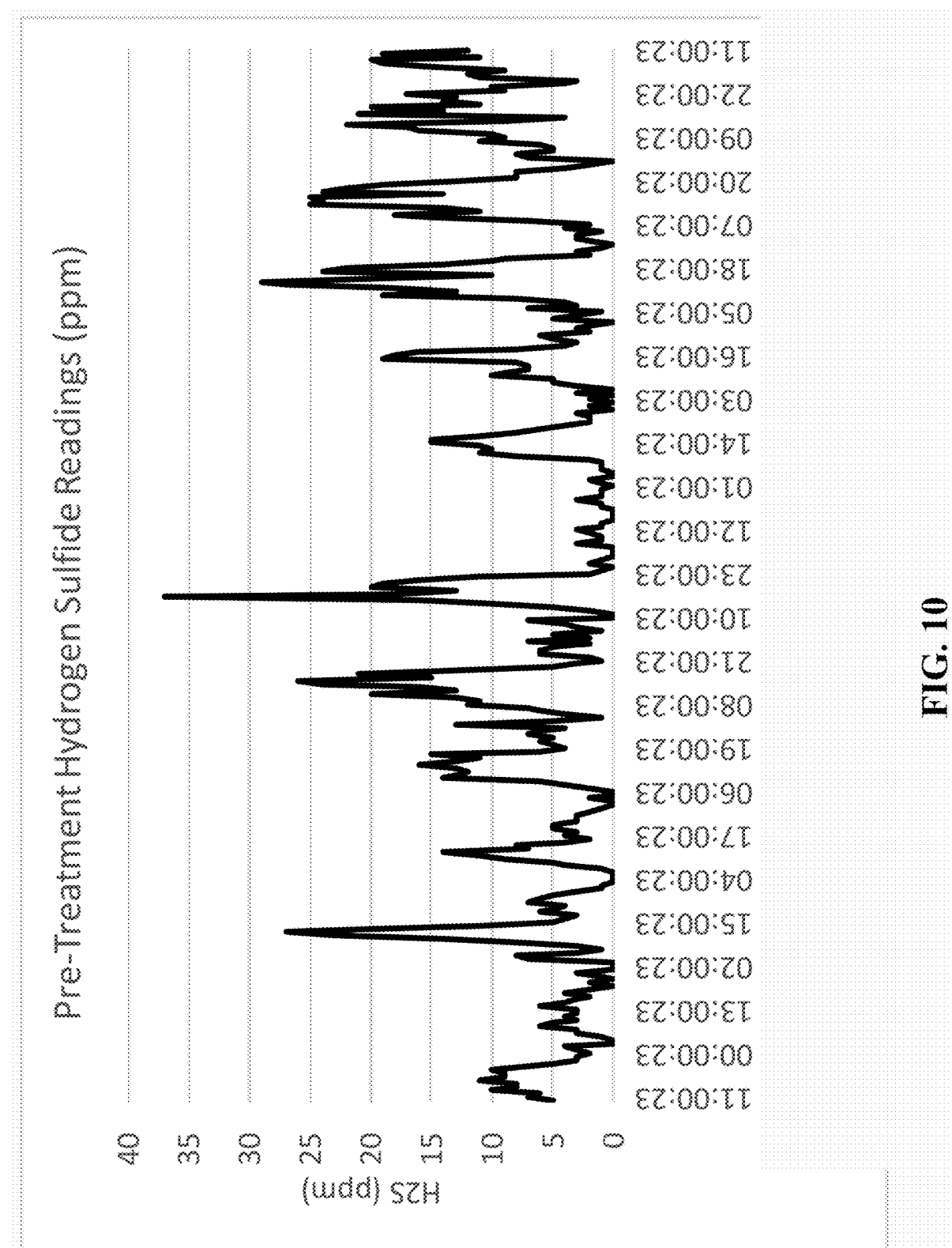
FIG. 10 is a plot of hydrogen sulfide breakthrough versus time in an exemplary experimental embodiment.
Figure 11:
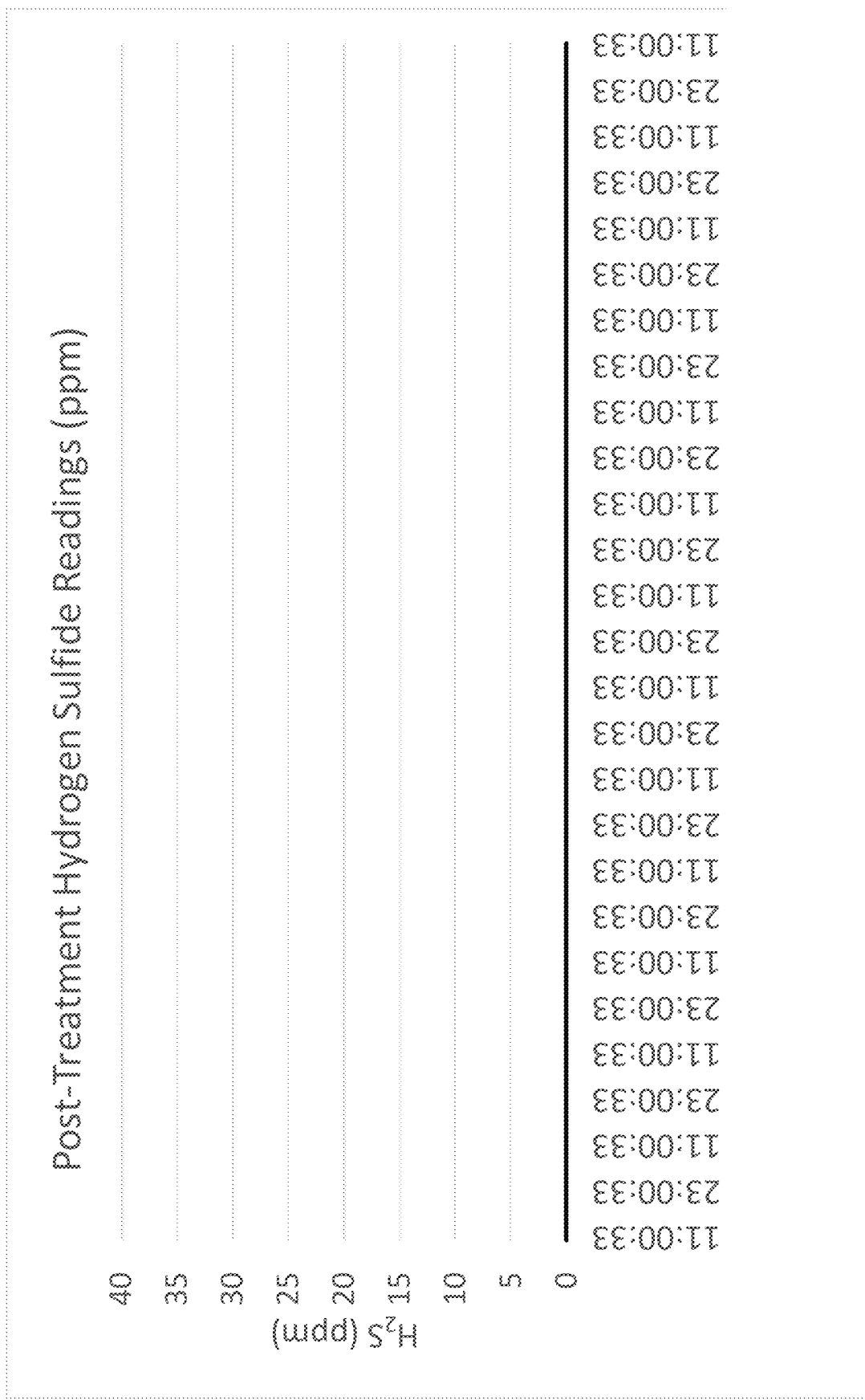
FIG. 11 is a plot of hydrogen sulfide breakthrough versus time in an exemplary experimental embodiment.

Data collected from the air within the wet well (pre-treatment inlet air) and at the top of the treatment exhaust port (post-treatment outlet air) via an Odalog (from Detection Instruments) is presented in FIGS. 10 and 11. As can be noted in FIG. 10, the wet well responsible for the inlet hydrogen sulfide contaminated air provided air containing a wide range of hydrogen sulfide contamination, with values consistently over 10 to 20 ppm and as high as 37 ppm of hydrogen sulfide. FIG. 11 plots the consistent zero ppm readings for hydrogen sulfide within post-treatment air vented through the exhaust stack at the top of the treatment unit. The pH of the VTX in the treatment tank remained approximately 8.0+/−0.2 throughout the study as tested with an Oakton Ion 6+pH meter.

Conclusions

The VTX catalyst treatment performed at a high rate of hydrogen sulfide removal efficiency under the conditions of the two-week pilot study. Contact time of approximately 3.7 seconds proved to be effective in removing hydrogen sulfide from the small bubble diffusing system (i.e. bubbles generated through 5/32" diffusion holes) that forced hydrogen sulfide gas to bubble up through the VTX catalyst. The number of 5/32" diffusion holes within the diffusion system approximated the cross-sectional area of the 1½" diameter piping delivering contaminated air from the blower plus 20%. The pH of the system was approximately 8.0+/−0.2 throughout the study. The effective ratio of the volume of 22% VTX treatment liquid within the treatment vessel (as expressed in cubic feet of VTX liquid) to volume of contaminated air flow (in standard cubic feet/minute) was 0.45 cubic feet of VTX:1.0 standard cubic foot/minute of contaminated air flow under the conditions of this study.

Process Implementations

As described above, certain exemplary embodiments are based, at least in part, on the surprising discovery that a particular novel active ferric chelate, Ferric MGDA, and selected oxidants unpredictably demonstrate significant activity at treating contaminants associated with a medium (e.g., hydrogen sulfide in wastewater and/or a dirty gas stream) above and beyond the activity which would be expected in the presence of the selected oxidant alone. Thus, exemplary embodiments can comprise compositions, methods, and/or systems that can be useful for the management and/or treatment of sulfide within and/or escaping to the atmosphere from industrial and/or municipal wastewater and/or dirty gas streams.

Certain exemplary methods can rely upon selected ferric/ferrous chelates (sometimes herein referred to as "ferric chelates" or "ferro chelates", such as the ferro aminocarboxylates), potentially including ferro MGDA, ferro EDTA, ferro HEIDA ferro NTA, ferro gluconate and/or other ferro chelants. The reaction of the ferro chelates can oxidize chelates in the ferrous state to the ferric state. It is currently projected that the ferro chelate can react with sulfide to rapidly oxidize sulfide that can create elemental sulfur, such as at a circum-neutral pH or higher. In the process, ferric chelate can be reduced to the ferrous chelate state. Oxygen and/or air, which can be oxygen-containing air within the gas stream, then can oxidize the resulting ferrous chelate back to the ferric chelate state for an additional reaction with sulfide. This cycle can continue until the oxygen is fully depleted and/or the hydrogen sulfide is substantially to fully oxidized.

More broadly, certain exemplary embodiments comprise a method for reducing a concentration of a contaminant associated with a medium, comprising treating the medium with a ferro chelate and an oxidant in amounts effective to oxidize, react, convert, sequester, precipitate, separate, and/or capture at least a portion of the contaminant.

The medium can be, for example, any liquid, such as water, groundwater, leachate, well water, wastewater, sewer water, blackwater, graywater, bilge water, ballast water, feed water, process water, industrial water, irrigation water, recreational water, pond water, lake water, creek water, river water, rain water, runoff water, pool water, cooling water, non-potable water, potable water, drinking water, semi-pure water, and/or spent ultra-pure water, etc.

Likewise, the medium can be any fluid, such as air, vapor, liquid, exhaust, process gas, and/or vent gas, etc. Moreover, the fluid can occupy a space defined at least in part by a vessel, such as for example, a tunnel, mine, well, ditch, canyon, cavern, cave, hole, corner, niche, bunker, building, compartment, room, clean room, enclosure, container, tank, pipe, headspace, equipment, ship, airplane, vehicle, automobile, and/or train, etc.

The medium can be anaerobic or aerobic. If aerobic, the medium itself can provide the oxidant and/or can be supplemented with one or more oxidants.

Figure 7:
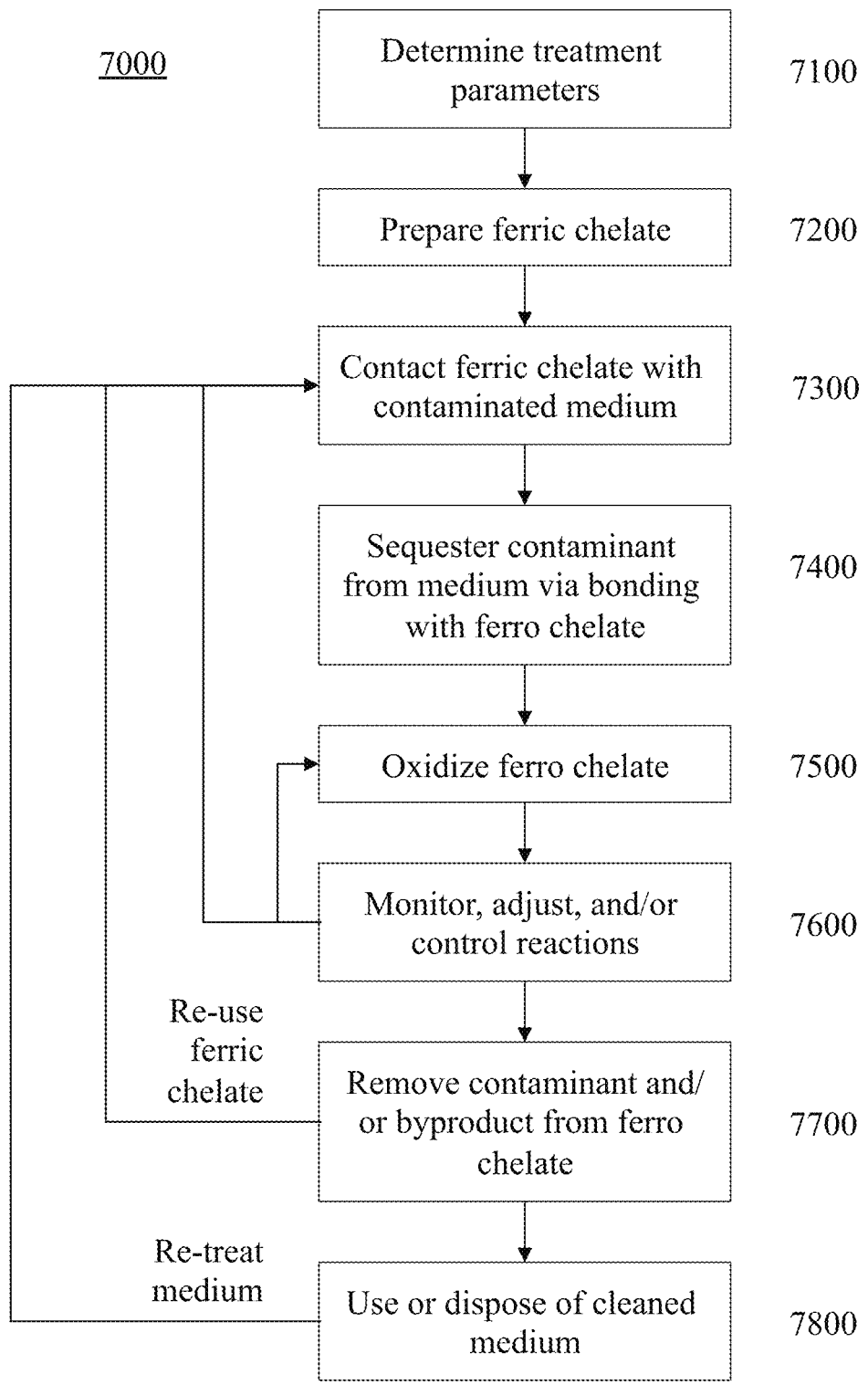
FIG. 7 is a flowchart of an exemplary embodiment of a method.

FIG. 7 is a flowchart of exemplary embodiment of a method 7000, which can begin at activity 7100 by determining treatment parameters. Included in this determination can be activities such as sampling the medium to detect if a contaminant (e.g., hydrogen sulfide) is present, analyzing the sample or the medium to determine the concentration of the contaminant, determining an amount of the medium to treat, determining where to treat the medium (e.g., distance upstream within a flow, location within vessel, etc.), and/or determining the desired and/or actual temperatures, pressures, masses, volumes, and/or flowrates of the medium, the ferric/ferrous chelate, the oxidant, and/or reaction products and/or byproducts.

At activity 7200, effective amounts of the ferric chelate can be prepared. One method of preparing ferric/ferrous chelate is to directly mix with a chelated agent a source of ferric ion, such as an aqueous solution of a ferric salt, such as ferric perchlorate, ferric nitrate, ferric citrate, ferric malate, ferric lactate, and/or ferric oxalate, etc. Numerous chelating agents are available that can work, at varying degrees of effectiveness, such as sodium gluconate (GLC), sodium nitriloacetate NTA), sodium methylglucine diacetate (MGDA), and/or sodium ethyldiaminetricacetate (EDTA). Another method is to mix a liquid ferric chloride solution with a chelating agent, such as GLC, MGDA, or EDTA. Ferric chloride can be purchased as a ~13% ferric solution with a pH of about 1.0 to about 1.5 from Univar, 825 Fisher Street, Martinsville, Va., in 55 gallon drum and tanker load quantities.

One chelating agent, MGDA, which is sometimes referred to as methylglycinediacetate and/or as trisodium methylglycinediacetate), can be purchased from BASF Corp, 3000 Continental Drive—North, Mount Olive, N.J., 07828-1234, under their product name, Trilon M. It can be purchased as an approximately 39% concentrated liquid in 55 gallon drum and tanker load quantities. Trilon M has a density of approximately 1.29 to approximately 1.33 g/cm3, a pH of approximately 10.0 to approximately 12.0, and a molecular weight of MGDA-Na3: 271. Drinking water grade 42% ferric chloride can be purchased commercially from a variety of commodity chemical suppliers to include Hydrite Chemical Company 300 North Patrick Blvd., Brookfield, Wis., 53045.

Formulation of one liter of one ferric chelate, Ferric MGDA, can be made by adding 52.3 milliliters (~27 grams of MGDA-Na3 depending on density) of Trilon M liquid to approximately 800 milliliters of water. This solution then can be mixed continuously with a magnetic stir bar or other mechanical mixing technique. Liquid ferric chloride solution can be added to the solution while the pH of the mixture is monitored. The pH of Trilon M/water mixture can be from 10 to 12 initially. Ferric chloride can be added until the pH of the solution comes down to a pH of about 5.0. Water can be added to achieve a final volume of 1000 millimeters. At this point the Ferric MGDA can be ready for use. Larger volumes can be produced by scaling-up this formulation. In various alternative embodiments, liquid ferric chloride solution can be added to undiluted MGDA.

Similarly, formulation of 100 pounds of Ferric MGDA liquid/solution can be made by adding approximately 74.18 pounds of MGDA-Na3 depending on density) of Trilon M liquid to approximately 25.82 pounds of drinking water grade 42% ferric chloride solution. Ferric iron content in this version of the formulation for Ferric MGDA approximates 45 grams/liter. This solution can be then mixed continuously with a stainless steel mixer and/or other mechanical mixing technique. Water can be added to achieve a final volume of approximately 9.25 gallons. At this point the Ferric MGDA can be ready for use. Different volumes can be produced by scaling-up or scaling-down this formulation as desired. In various alternative embodiments, liquid ferric chloride solution can be added to undiluted MGDA. Higher and/or lower molar solutions also can be prepared. In certain exemplary embodiments, the Ferric MGDA can be provided and/or utilized as a slurry, dispersion, or foam.

As explained above, Ferric MGDA can capture sulfur from a dirty gas stream and bind it to one, some, or all irons in the ferric MGDA, thereby converting the ferric MGDA to ferrous MGDA. Certain exemplary embodiments can utilize an oxidant to help break such bonds, thereby releasing and precipitating elemental sulfur from the ferrous MGDA while converting the ferrous MGDA to Ferric MGDA. Any one or more of numerous oxidants can be utilized, including, e.g., a peroxide, ozone, nitrate, chlorite, chlorine dioxide, permanganate, and/or a halogen, etc., and/or any direct source of oxygen, such as air.

Thus, one potential oxidant is nitrate, from which oxygen can be obtained. Formulation of a nitrate solution can be made by adding sodium nitrate, calcium nitrate, nitric acid, and/or any other salt of nitrate to a ferro chelate solution to attain a final concentration of nitrate in a range of approximately 3.5 M to approximately 4.5 M with a final ferro chelate concentration in a range of approximately 0.05 M to approximately 1.0 M. A typical formulation might be a 4.2 M nitrate and 0.1 M ferro chelate mixture.

Another potential oxidant is oxygen itself, which can be introduced to the treatment process in nearly any form, such as substantially pure commercially available oxygen, substantially pure oxygen that made at the site of treatment, oxygen-containing gas (e.g., nitrogen), and/or oxygen-enriched and/or atmospheric air that contains oxygen (whether flowing via compressed/forced flow and/or induced flow). Oxygen can be introduced at, for example, a minimum concentration of 1.5 times the amount of available sulfide to be treated within a gas stream and/or a wastewater stream. Dosages of oxygen can exceed sulfide concentrations from approximately 3 to approximately 4 times on a mass to mass basis. Higher dosages of oxygen can further speed the reaction and/or improve its efficiency.

The Ferric MGDA and/or other ferro chelates can be applied to a contaminated medium before, during, in combination with, and/or after contact with the oxidant (e.g., oxygen and/or air), in amounts and/or concentrations effective to degrade, and/or substantially reduce, the concentration of, the target contaminant (e.g., sulfide). The amounts of Ferric MGDA and/or other ferro chelates and oxidant needed and/or utilized can depend upon, for example, the concentration of the contaminant to be degraded, the available reaction time, temperature of the reactants (e.g., the Ferric MGDA and/or other ferro chelates, the oxidant, and/or the contaminated medium (e.g., dirty gas stream, wastewater volume, and/or wastewater stream)), and/or the organic matter content of the medium.

In certain exemplary embodiments, the Ferric MGDA and/or other ferro chelates and one or more oxidants can be mixed, and even conveyed, before being applied to the contaminated medium. In certain exemplary embodiments, the Ferric MGDA and/or other ferro chelates and the one or more oxidants can mix while in contact with the contaminated medium.

At activity 7300, the Ferric MGDA and/or other ferro chelates and the one or more oxidants can be applied to the contaminant, the medium, and/or the contaminated medium (e.g., a dirty gas stream). Either of the Ferric MGDA and/or other ferro chelates and the oxidant can be applied as liquid and/or vapor. For example, the ferric chelate(s) and/or the oxidant(s) can contact the contaminated medium in the presence of water, such as in a wastewater stream. " " " " Likewise, the oxidant(s) can contact the contaminated medium and/or the ferro chelate(s) as a liquid and/or vapor.

At activity 7400, the ferro chelate(s) (e.g., Ferric MGDA) can contact and react with the contaminated medium (e.g., a dirty gas stream) and thereby sequester a contaminant(s) (which includes an constituent thereof, such as sulfide) from the contaminated medium, potentially via bonding of the contaminant with iron(s) of the ferro chelate(s), potentially such that all iron ions in the chelate(s) are saturated with the contaminant. The contact can occur in a vessel and/or can result in a "dirty" ferro chelate and/or a saturated ferro chelate solution.

At activity 7500, the ferro chelate (e.g., ferrous MGDA) can contact and/or react with the oxidant(s) such that the ferro chelate(s) is at least partially oxidized. During such oxidation, bonds can be broken between the ferro chelate's iron and the contaminant, which in the case of sulfide can cause elemental sulfur to precipitate out of its corresponding dirty ferro chelate solution. The breaking of the bonds also can convert and return the previously saturated and/or dirty ferro chelate from a "dirty" ferrous chelate (e.g., ferrous MGDA) to a "clean" ferric chelate (e.g., Ferric MGDA). The oxidant can be contained in the contaminated medium itself (e.g., air in a dirty gas stream) and/or can be added to the ferro chelate solution and/or the contaminated medium (e.g., as peroxide, nitrate, substantially pure oxygen, and/or additional air, etc.), such as before, during, and/or after contact occurs between the ferric chelate and the contaminated medium and/or contaminant.

During the reaction(s), at least a portion of the contaminant can be oxidized, converted, precipitated, separated, decontaminated, and/or sanitized. In the case of biologicals, the reaction can kill a life form, render ineffective an amino acid, and/or denature a protein. As a result of the reaction, the concentration of the contaminant can be reduced by a factor of, for example, at least 2, 5, 10, 20, 50, 100, 200, 500, 1000, 2000, 5000, 10000, 20000, and/or 50000, etc., and/or a factor anywhere between any of those values.

In certain exemplary embodiments, the ferric chelate and/or the oxidant can be added to the medium at ambient temperature. In certain exemplary embodiments, ultra-violet light and/or other forms of light, radiation, and/or energy, etc., can be utilized to speed any aspect of the process, including, e.g., sequestration, oxidation, and/or precipitation, etc.

At activity 7600, the reaction(s) between the Ferric MGDA and/or other ferro chelates, oxidant, and the contaminant can be monitored, adjusted, and/or controlled. For example, included in this activity can be activities such as sampling the medium to detect if a contaminant is still present, analyzing the sample or the medium to identify what contaminant(s) remains and/or to determine what concentrations of the contaminant remain, and/or monitoring, adjusting, and/or controlling temperatures, pressures, amounts, volumes, and/or flowrates of the contaminated medium, the Ferric MGDA and/or other ferro chelates, the oxidant, reaction product(s), and/or the decontaminated medium.

To increase the temperature, pressure, and/or rate of the reaction(s), an accelerant can be added to, for example, the contaminated medium, the ferric chelate (e.g., Fe-MGDA), the oxidant, and/or the reacting mixture. Such an accelerant can be, for example, an organic compound and/or biological that can react rapidly with the ferric chelate and the oxidant. For example, a non-toxic organic accelerant could be put into wastewater to cause substantial bubbles to be formed during the reaction(s), thereby lifting the chelate(s) and/or oxidant(s) up to where some portion of the target contaminants might be located.

Heat generated by the reaction(s) can be captured, transferred, and/or utilized. For example, the reaction(s) can occur within a reactor vessel that is surrounded by cooling coils. The heat absorbed by a heat transfer fluid circulating in the coils can be used for any heating purpose, such as to dry the substantially decontaminated medium, to dry any resulting concentrated volume of contaminant, and/or to heat another process, fluid, and/or environment.

Moreover, the reaction(s) can occur with such intensity as to create a controlled and/or uncontrolled explosion. A controlled explosion can be used, for example, to generate propulsion, and/or to create a mechanical cleaning effect. As a further example, the pressure, temperature, and/or decontamination caused by a sufficiently rapid reaction down-hole in an oil and/or gas well can "frac" the well, thereby removing and/or dislodging substances clogging the well and improving a flowrate of the well.

The reaction(s) can be allowed to run its course, can be slowed, and/or can be halted, for example, before complete oxidation of the contaminant has occurred. Adding an additional oxidizable substance to the medium, thereby diverting some of the reactants and/or oxidants to the additional substance and/or consuming the oxidants' oxidizing capability can cause such a slowing and/or halting. Moreover, such a halting of the reaction(s), or at least a decrease in the reaction rate, can also occur by reducing and/or limiting the flow of the reactants (e.g., either Fe-MGDA, the oxidant, the contaminated medium, and/or the additional oxidizable substance), changing the concentration of any of the reactants, lowering the temperature of any of the reactants, and/or by withdrawing heat generated by the reaction(s).

At activity 7700, during and/or after the reaction(s), the ferro chelate and/or the medium can be treated to change a concentration of a substance (e.g., iron, elemental sulfur, etc.) associated with the ferro chelate and/or the medium. For example, additional ferric chelate can be added to the existing ferric chelate.

As another example, at least a portion of some form of the contaminant, such as the precipitated and/or insoluble elemental sulfur byproduct in the case of degraded hydrogen sulfide, can be removed from the ferro chelate, such that the ferro chelate can be re-used for degrading the contaminant (e.g., converting the hydrogen sulfide in the dirty gas stream to hydrogen and sulfide/sulfur). The removed byproduct can be cleaned, purified, and/or packaged, utilized in any chosen manner, and/or disposed of as desired.

Similarly, at activity 7800, the substantially cleaned and/or decontaminated medium can be disposed. Prior to disposal, however, the medium can be sampled to detect the amount and/or concentration of any contaminant (e.g., sulfide) that might be still present in the medium. Thus, a determination can be made regarding how much reduction has occurred in the target contaminant, and whether or not to recycle or re-treat the medium for further decontamination.

If needed, the substantially decontaminated medium (e.g., the clean gas stream) and/or any byproducts (e.g., elemental sulfur) can be disposed of at the treatment site and/or at a remote site. The disposal site can be, for example, the atmosphere, soil, groundwater, a surface waterway, an injection well, and/or a landfill, etc.

Process Parameters and Details

Certain exemplary embodiments can require that the pH be in a range of approximately 6.0 to approximately 8.5, including all values and sub-ranges there between. Data from studies suggest that higher pH levels are more effective than those below pH 6.0. Certain exemplary embodiments can provide a wastewater stream, a dirty gas stream, oxygen, and/or compressed air that can contact the aqueous ferric/ferrous chelate (e.g., Ferric MGDA) (e.g., via dripping, blowing, bubbling, diffusing, entraining, and/or sparging etc.) at a point sufficiently upstream (e.g., within and/or upstream of the vessel) to allow for sufficient contact time (e.g., ranging from 1 second to 10 minutes, including all values and sub-ranges therebetween, such as approximately 2.5 seconds, 12.7 seconds, 30 seconds, 1 minute, 3 minutes, etc.) between the wastewater, dirty gas stream, the aqueous chelate, and/or the oxidant before the point at which the wastewater and/or gas exits the vessel (which can be, e.g., a pipe, container, room, etc.) to a waterway, injection well, holding tank, the atmosphere, etc. Ferric/ferrous chelate can be injected and/or otherwise provided so as to substantially to completely contact and/or mix with the wastewater, dirty gas stream, oxygen, and/or compressed air. In one exemplary embodiment, data suggests that control of sulfide can be expected for up to 24 hours.

Ferro chelates can be added at a rate of approximately 90 milligrams/liter to approximately 60 grams/liter of ferro chelate (as iron) within a scrubber column design for removing and oxidizing sulfide to elemental sulfur under aerobic conditions. Higher dosages can be used to achieve a more rapid response for selected situations.

Certain exemplary embodiments can comprise compositions, methods, and/or systems that can be useful for the treatment of existing total sulfide within a dirty gas stream, an aerobic atmospheric environment, and/or an anaerobic wastewater volume and/or flow and/or to prohibit further formation of sulfide after removal via an oxidation that couples ferric chelates with oxidants. Certain exemplary processes can utilize selected ferric chelates (such as the ferro aminocarboxylates), potentially including ferric/ferrous MGDA, ferric/ferrous EDTA, ferric/ferrous HEIDA, ferric/ferrous NTA, ferric/ferrous gluconate, and/or other ferric chelants, in combination with an oxidant, such as oxygen, atmospheric air, hydrogen peroxide, calcium peroxide, magnesium peroxide, ozone, persulfate, chlorite, hypochlorite, chlorine, bromine, permanganate, and/or chlorine dioxide, to produce highly reactive free and/or hydroxyl radicals to oxidize existing total sulfide to elemental sulfur.

A second tier of treatment can be achieved through the addition of nitrate and/or nitrite from calcium, sodium, potassium, and/or ammonium nitrate/nitrite salts. It is suggested that nitrate/nitrite might react with the ferric/ferrous chelates to shift a selected ferrous chelate to ferric chelate that then reacts with sulfide to oxidize it to elemental sulfur. The remaining nitrate can act to stop further formation of sulfide under anaerobic conditions for lengthy periods of time, depending on nitrate dosage. The combination of various process steps can result in a system that can effectively treat existing total sulfide and/or prevent the formation of additional sulfide under extended anaerobic conditions that are conducive to biological sulfide formation.

It is not necessarily currently known with certainty exactly how certain embodiments might cause the reduction in concentration of the total sulfide contaminant within an aerobic atmosphere. Nevertheless, the potential theory to describe the mechanism of the reaction is described above.

Gas Stream Process Steps

Certain exemplary embodiments can provide a batch or continuous process for removing hydrogen sulfide from aerobic gas, vapor, and/or atmospheric sources (herein collectively a gas stream), whereby the gas stream can be, e.g., bubbled up through a column of an aqueous solution of alanine, N,N-bis(carboxymethyl)-, iron metal to remove hydrogen sulfide from the gas. The alanine, N,N-bis(carboxymethyl)-, iron metal can react with sulfide and hold it with a weak bond that subsequently can be oxidized with relatively low concentrations of a selected oxidant, such as atmospheric air, oxygen, etc. Insoluble elemental sulfur can be formed, with close control of pH and/or Oxidation Reduction Potential (ORP), and then can be filtered from the aqueous solution using commonly available methods. The alanine, N,N-bis(carboxymethyl)-, iron in the aqueous solution can be ready for the capture of additional hydrogen sulfide once the oxidant reacts with the sequestered sulfide.

Certain exemplary embodiments can provide a process for treating hydrogen sulfide within a stream of gas (a "dirty gas stream"). The process can comprise introducing the dirty gas stream into an atmospheric and/or pressure vessel (e.g., a wet scrubber, absorber, bubble tower, venturi scrubber, ejector venturi scrubber, baffle spray scrubber, spray tower, spray dryer, packed column, packed bed, fluidized bed, pressurized reactor, static mixer, etc.) and contacting the dirty gas stream with an aqueous solution of alanine, N,N-bis(carboxymethyl)-, iron (Ferric MGDA), wherein the system can be either a batch treatment system or a continuous flow system.

The dirty gas stream can be introduced to the aqueous solution via a diffuser, which can achieve small gas bubble diameter, particularly in a vessel designed as a bubble tower.

For efficient treatment, the aqueous solution in the vessel receiving the dirty gas stream can be held within a pH range of approximately 5.9 to approximately 10, including all values and sub-ranges therebetween, such as approximately 7 to approximately 8 or approximately 8 to approximately 9, and/or the oxidation-reduction potential (ORP) of the dirty gas stream can be held within a range of approximately −131 mV to approximately −425 mV, such as approximately −150 mV to approximately −325 mV.

Control of pH can be accomplished using common acids and/or bases. The pH also can be uniquely adjusted using small quantities of oxidants such as sodium percarbonate, calcium peroxide, magnesium peroxide, hydrogen peroxide, sodium persulfate, and/or sodium chlorite, etc., which can accomplish pH adjustment and oxidation simultaneously. Exposure of oxidants to Ferric MGDA that has sequestered sulfide can convert the sulfide to elemental sulfur while re-triggering the Ferric MGDA to react with additional sulfide. Other oxidants include oxygen (possibly as air) that is already in the dirty gas stream or is added to the dirty gas stream, within the vessel and/or upstream of the vessel.

Continuous or semi-continuous addition of one or more of the selected oxidants to maintain the ORP within a desired range can assure maximum availability of Ferric MGDA for sequestration of sulfide and/or maximum efficiency of conversion of sulfide to elemental sulfur within the range of pH from approximately 7 to approximately 10, including all values and sub-ranges therebetween, such as approximately 7 to approximately 9, approximately 7.1 to approximately 8.0, etc.

Continuous and/or batch treatment of a dirty gas stream containing hydrogen sulfide can be accomplished by diffusing the dirty gas stream through a column of Ferric MGDA liquid at a rate of contact of approximately one second to approximately five seconds using a fine bubble diffuser. Diffusing the gas stream through the Ferric MGDA liquid can help maximize exposure of the hydrogen sulfide to the Ferric MGDA liquid. A packed column design might provide better contact than an open channel design.

The concentration of Ferric MGDA used within vessels for removing hydrogen sulfide from a gas stream can range from approximately 0.01 M to approximately 2.3 M and/or the active iron available can range from approximately 225 mg/l to 45 grams/liter of Fe-MGDA.

Re-triggering Ferric MGDA with sequestered sulfide can be continuously accomplished by re-circulating the column liquids containing Ferric MGDA and sequestered sulfide through the same or a second vessel to receive dosages of oxidant at a rate sufficient to maintain the ORP within a desired range and/or to receive pH adjustment chemicals to maintain the appropriate pH. The operating conditions can be chosen to maintain the oxidant dosage at a ratio approximating 1:1 moles of oxidant to sequestered sulfide to maximize chemical usage efficiency. Filtration of elemental sulfur from the aqueous solution of ferro MGDA can be accomplished within the vessel and/or within a second vessel, and can occur continuously, semi-continuously, and/or in batches.

An entrainment separator can be used to remove any aqueous solution that is entrained in the clean gas stream.

For batch treatment, the flow of the dirty gas stream can be shut off while the re-triggering of Ferric MGDA occurs and/or elemental sulfur is removed by filtration of the oxidized Ferric MGDA reagent. The flow of the dirty gas stream can be turned back on after the re-triggering event and/or proper adjustments for ORP and/or pH have been accomplished.

Figure 8:
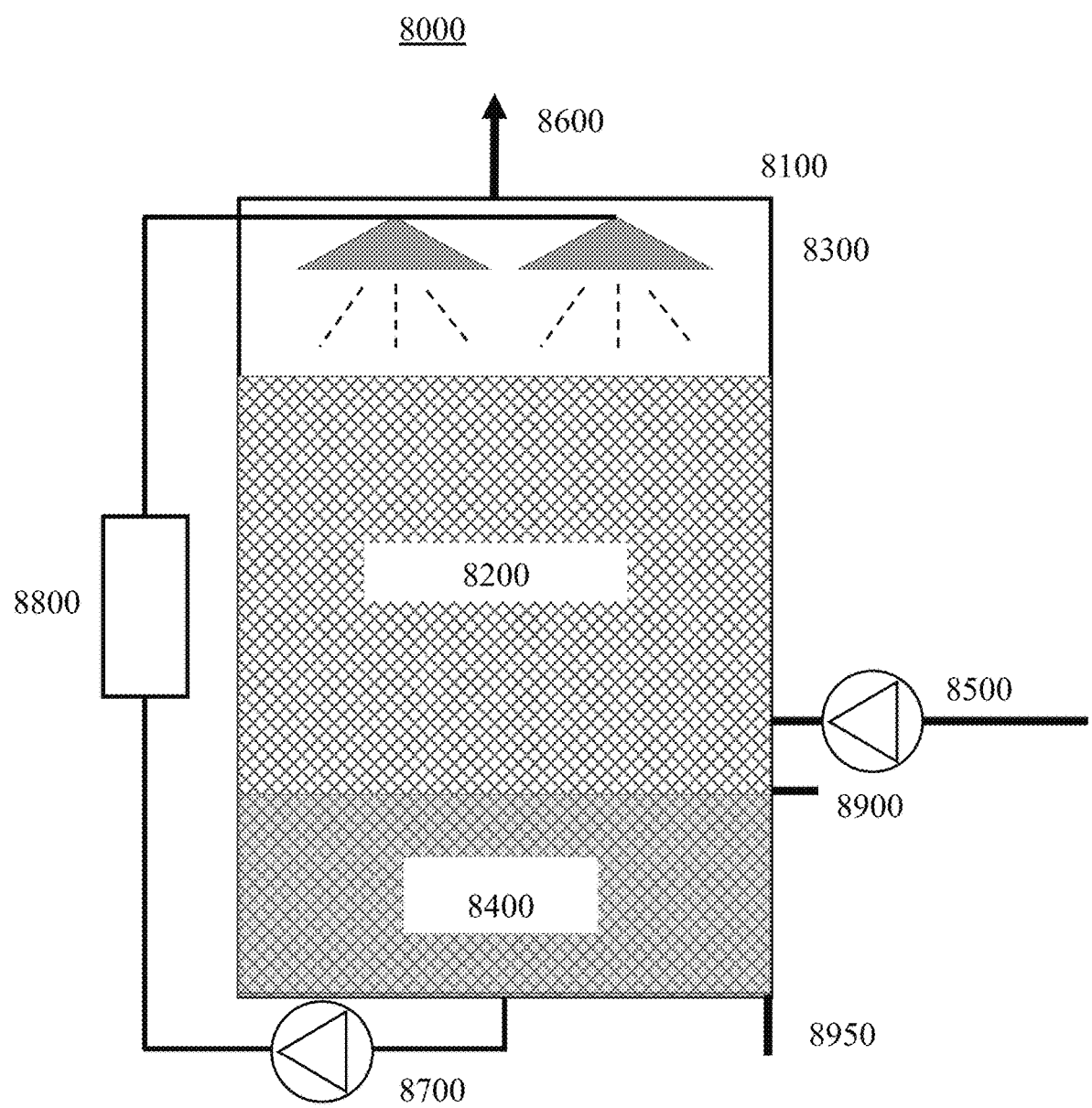
FIG. 8 is a block diagram of an exemplary embodiment of a system.

FIG. 8 illustrates an exemplary embodiment of a system 8000 for treating a dirty gas stream via a vessel 8100 that can be at least partially filled with packing 8200 through which a ferro chelate solution can flow downward from spray nozzles 8300 to a chemical reservoir 8400, where it can be substantially contained. A dirty gas stream can be blown into packing 8200 via a blower 8500 and/or can flow up through packing 8200 and/or out clean gas exhaust 8600. A recirculation pump 8700 can withdraw ferro chelate solution from chemical reservoir 8400 and/or can cause it to flow through a solid filter system 8800 to remove elemental sulfur and/or can cause the resulting substantially sulfur-free ferro chelate solution to flow to spray nozzles 8300. The ferro chelate can be recirculated at a rate of at least 0.055 gallons of ferro MGDA per cubic foot of the contaminated gas stream. As needed, additional ferro chelate solution can be added through inlet 8900 and/or withdrawn though drain 8950.

Figure 9:
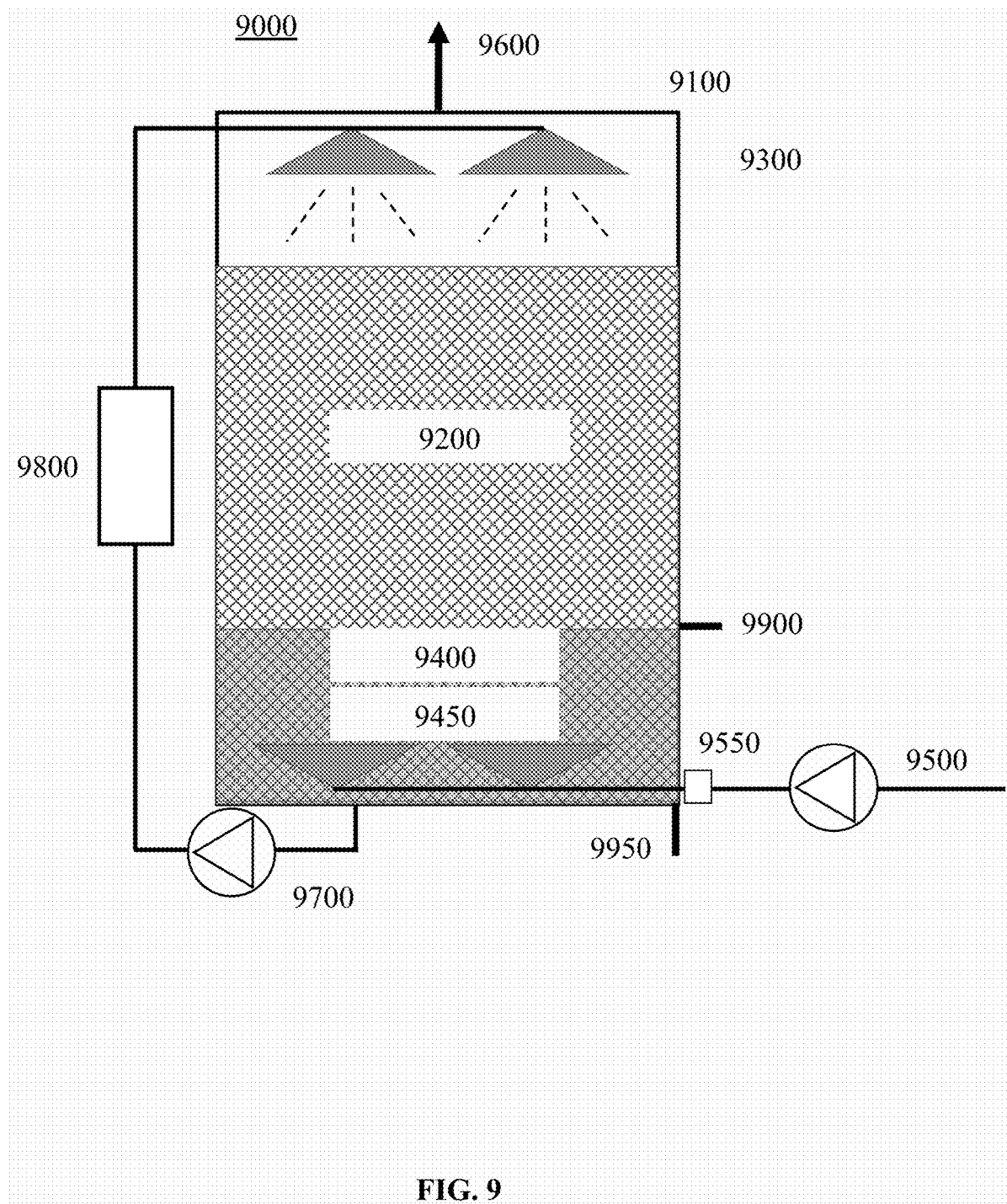
FIG. 9 is a block diagram of an exemplary embodiment of a system.

FIG. 9 illustrates an exemplary embodiment of a system 9000 for treating a dirty gas stream via a vessel 9100 that can be at least partially filled with packing 9200 through which a ferro chelate solution can flow downward from spray nozzles 9300 to a chemical reservoir 9400, where it can be substantially contained. A dirty gas stream can be blown through bubble diffusers 9450 and into reservoir 9400 via a blower 9500 and/or can flow up through packing 9200 and/or out clean gas exhaust 9600. A check valve 9550 can resist and/or prevent flow of the ferric chelate solution toward blower 9500. A recirculation pump 9700 can withdraw ferro chelate solution from chemical reservoir 9400 and/or can cause it to flow through a solid filter system 9800 to remove elemental sulfur and/or can cause the resulting substantially sulfur-free ferro chelate solution to flow to spray nozzles 9300. The ferro chelate can be recirculated at a rate of at least 0.055 gallons of ferro MGDA per cubic foot of the contaminated gas stream. As needed, additional ferric chelate solution can be added through inlet 9900 and/or withdrawn though drain 9950.

Thus, certain exemplary embodiments can treat an aerobic contaminated gas stream, which can occur in and/or be obtained from the aerobic contents of the headspace of a vessel, the aerobic contaminated gas stream and/or aerobic contents containing air with a hydrogen sulfide concentration of approximately 150 ppm or higher. The treatment can comprise, potentially repetitively, continuously, intermittently, and/or in batches:
  passing the aerobic contaminated gas stream and/or aerobic contents through a vessel containing an aqueous solution comprising approximately 0.5% Ferric MGDA to approximately 100% Ferric MGDA, including each and every value and sub-range there between, such as from any of to any of approximately 1%, 3.33%, 6.5%, 14.77%, 20%, 25%, 41.29%, 50%, 66.6%, 75%, 83.5%, 92.51%, 95%, 97%, and/or 99.3%, etc.;
  forming bonds between the hydrogen sulfide with the Ferric MGDA, resulting in saturating the Ferric MGDA;
  mixing the solution with hydrogen peroxide, oxygen, and/or one or more other oxidants;
  breaking the bonds between the hydrogen sulfide and the Ferric MGDA to form a re-activated solution comprising elemental sulfur and re-activated Ferric MGDA;
  removing the elemental sulfur from the re-activated solution to form a substantially hydrogen-sulfide-free solution; and/or
  re-cycling the substantially hydrogen-sulfide-free solution to the vessel.

Certain exemplary embodiments can provide a method for treating an aerobic contaminated gas stream, comprising:
  performing a first plurality of activities, the first plurality of activities comprising:
    contacting the aerobic contaminated gas stream with a clean aqueous solution comprising approximately 0.5% Ferric MGDA to approximately 100% Ferric MGDA, the aerobic contaminated gas stream comprising air and comprising hydrogen sulfide at a concentration in the air of approximately 150 ppm or higher;
    forming bonds between the hydrogen sulfide and the iron in the Ferric MGDA to create a dirty aqueous solution comprising hydrogen sulfide saturated Ferric MGDA and an aerobic clean gas stream having a hydrogen sulfide concentration of 3.5 ppm or less;
    mixing the dirty aqueous solution with an oxidant; and/or via a reaction with the oxidant, breaking the bonds between the hydrogen sulfide and the Ferric MGDA to form elemental sulfur mixed with a re-activated solution comprising re-activated Ferric MGDA;
  separating the elemental sulfur from the re-activated solution to form a substantially hydrogen-sulfide-free solution; and/or
  re-cycling the substantially hydrogen-sulfide-free solution to serve as the clean aqueous solution;
  wherein:
    each of the first plurality of activities occurs in a common vessel;
    repeating the first plurality of activities;
    repeating the first plurality of activities without introducing additional Ferric MGDA to the clean aqueous solution;
    causing flow of the aerobic contaminated gas stream into the vessel;
    said contacting comprises bubbling the aerobic contaminated gas stream through the clean aqueous solution;
    said contacting comprises blowing the aerobic contaminated gas stream into the clean aqueous solution;
    said contacting comprises spraying the clean aqueous solution into the aerobic contaminated gas stream;
    said contacting comprises dripping the clean aqueous solution into the aerobic contaminated gas stream;
    the clean aqueous solution has a pH of 5.9 or higher;
    the clean aqueous solution has a pH of 8 or higher;
    the oxidant is a peroxide;
    the oxidant is the clean gas stream;
    the oxidant is oxygen; and/or
    the oxidant is atmospheric oxygen.

Certain exemplary embodiments can provide a method comprising:
  in a substantially aerobic treatment zone of a vessel, reacting reactants comprising Ferric MGDA and an aerobic contaminated gas stream, the aerobic contaminated gas stream comprising air mixed with hydrogen sulfide, the hydrogen sulfide present at a concentration of at least 150 ppm, wherein:
    reaction products of the reacting comprise:
      a spent ferrous MGDA saturated with sulfide; and/or
      an aerobic clean gas stream having a concentration of hydrogen sulfide of no greater than 3.5 ppm;
    a content of the aerobic treatment zone is actively maintained at a pH of between approximately 7 and approximately 10;
    the aerobic contaminated gas stream remains in contact with the ferro MGDA for at least 2.5 seconds; and/or the ferro MGDA is recirculated at a rate of at least 0.055 gallons of ferro MGDA per cubic foot of the aerobic contaminated gas stream.

Definitions

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.

acid—a compound capable of neutralizing alkalis and reddening blue litmus paper, containing hydrogen that can be replaced by a metal or an electropositive group to form a salt, or containing an atom that can accept a pair of electrons from a base. Acids are proton donors that yield hydronium ions in water solution, or electron-pair acceptors that combine with electron-pair donors or bases.

active ferric chelate—a ferric chelate that exhibits substantial activity toward oxidation of the contaminant to be degraded, i.e., is capable of generating free radicals or other reactive oxidants from an oxidant in the presence of a medium associated with a contaminant to be treated.

actively—via converting and/or amplifying voltages and/or currents, such as via a diode and/or transistor.

activity—an action, act, step, and/or process or portion thereof.

adapt—to design, make, set up, arrange, shape, configure, and/or make suitable and/or fit for a specific purpose, function, use, and/or situation.

adapted to—made to, designed to, and/or configured to perform a specified function.

adapter—a device used to effect operative compatibility between different parts of one or more pieces of an apparatus or system.

additional—something added and/or more.

adjust—to change, modify, adapt, and/or alter.

aerobic—a condition where molecular oxygen is substantially present in a gas, such as at a concentration greater than any value in the range of approximately 1,000 to approximately 50,000 ppm of oxygen in the gas, such as greater than any of approximately 2,000, 4,237, 5,000, 6123, 10,000, 13,350, 14,899, 17,520, 20,000, 22,400, 25,001, 27,968, 30,000, 35,000, 40,000, 43,880, etc. ppm, including all values between any of those values.

aerobic contaminated gas stream—a flow of a gas that comprises oxygen and a contaminate (such as hydrogen sulfide), the oxygen present in the gas at an aerobic level.

air—the earth's atmospheric gas.

amino carboxylate—a molecule containing carboxyl functional groups bound to an amine group.

anaerobic—a condition where molecular oxygen is substantially absent from a gas, such as at a concentration less than any value in the range of approximately 1,000 to approximately 50,000 ppm of oxygen in the gas, such as less than any of approximately 2,000, 4,237, 5,000, 6123, 10,000, 13,350, 14,899, 17,520, 20,000, 22,400, 25,001, 27,968, 30,000, 35,000, 40,000, 43,880, etc. ppm, including all values between any of those values.

and—in conjunction with.

and/or—either in conjunction with or in alternative to.

any—one, some, every, and/or all without specification.

apparatus—an appliance and/or device for a particular purpose.

approximately—about and/or nearly the same as.

aqueous—related to, produced by, similar to, containing, and/or dissolved in water.

aqueous oxidizing solution—any solution comprising an oxidant and water.

are—to exist.

associate—to join, connect together, accompany, and/or relate.

associated with—related to and/or accompanying.

at—in, on, and/or near.

at least—not less than, and possibly more than.

atmosphere—the air or climate in a specific place.

atmospheric—of, relating to, or existing in the atmosphere.

available—obtainable, not busy, not otherwise committed, accessible, present, suitable, and/or ready for use and/or service.

based on—indicating one or more factors that affect a determination, but not necessarily foreclosing additional factors that might affect that determination.

between—in a separating interval and/or intermediate to.

biosolids—stabilized and/or unstabilized solid, semi-solid, and/or slurried residuals generated by the biological treatment of sewage, petroleum refining waste, and/or industrial chemical manufacturing wastewater.

blow—to apply pressure to, cause to move, and/or expel a current of.

bond—Any of several forces, especially the ionic bond, covalent bond, and metallic bond, by which atoms or ions are bound in a molecule or crystal.

break—To overcome or put an end to, especially by force or strong opposition and/or to separate into components and/or parts.

bubble—(n) a thin, usually spherical or hemispherical film of liquid filled with air or gas and/or a globular body of air or gas formed within a liquid; (v) to flow through and/or to form, produce, and/or emit bubbles.

bubble tower—a vessel within which contaminated gas is diffused (bubbled) up through a treatment liquid to remove a contaminant from the gas.

can—is capable of, in at least some embodiments.

cause—to bring about, provoke, precipitate, produce, elicit, be the reason for, result in, and/or effect.

chelate—a chemical compound in the form of a heterocyclic ring, containing a metal ion attached by coordinate bonds to at least two nonmetal ions.

chelating agent (a.k.a. "chelate")—a heterocyclic compound having a central metallic ion attached by coordinate and/or covalent bonds to two or more nonmetallic atoms in the same molecule.

chlorate—any salt of chloric acid, and containing the radical and/or monovalent ion $ClO_3^-$.

clean—(n) substantially devoid of one or more contaminants; (v) to substantially rid of one or more contaminants, impurities, and/or undesired substances.

common—same, shared, and/or single.

composition—a composition of matter and/or an aggregate, mixture, reaction product, and/or result of combining two or more substances.

composition of matter—a combination, reaction product, compound, mixture, formulation, material, and/or composite formed by a human and/or automation from two or more substances and/or elements.

compound—a pure, macroscopically homogeneous substance consisting of atoms or ions of two or more different elements in definite proportions that cannot be separated by physical methods. A compound usually has properties unlike those of its constituent elements.

compress—to decrease the volume of air and/or other gas by the application of pressure.

comprises—includes, but is not limited to, what follows.

comprising—including but not limited to.

concentration—a measure of how much of a given substance is mixed, dissolved, contained, and/or otherwise present in and/or with another substance, and/or a measure of the amount of dissolved substance contained per unit of volume and/or the amount of a specified substance in a unit amount of another substance, both measures defining a structure of a composition that comprises both substances.

configure—to design, arrange, set up, shape, and/or make suitable and/or fit for a specific purpose, function, use, and/or situation.

configured to—designed, arranged, set up, shaped, and/or made suitable and/or fit for a specific purpose, function, use, and/or situation, and/or having a structure that, during operation, will perform the indicated activity(ies). To the extent relevant to the current application, the use of "configured to" is expressly not intended to invoke 35 U.S.C. § 112(f) for that structure.

connect—to join or fasten together.

contact—to touch and/or come together.

container—an enclosure adapted to constrain a flow of a fluid.

containing—including but not limited to.

contaminant—any substance that can be oxidized, such as, for example, a chemical compound, chemical mixture, organic compound, inorganic compound, hydrogen sulfide, and/or biological, etc. As a further example, the contaminant can be an organic compound, an organic compound having at least one aromatic functional group, and/or an organic compound having at least one aliphatic functional group, etc.

contaminated—comprising a contaminant.

content—that which fills and/or is substantially contained by.

convert—to transform, adapt, and/or change.

corresponding—related, associated, accompanying, similar in purpose and/or position, conforming in every respect, and/or equivalent and/or agreeing in amount, quantity, magnitude, quality, and/or degree.

coupleable—capable of being joined, connected, and/or linked together.

coupling—linking in some fashion.

create—to make, form, produce, generate, bring into being, and/or cause to exist.

cubic—shaped in a manner resembling a cube.

cycle—a set of predetermined activities.

define—to establish the meaning, relationship, outline, form, and/or structure of; and/or to precisely and/or distinctly describe and/or specify.

derive—to receive, obtain, and/or produce from a source and/or origin.

determine—to find out, obtain, calculate, decide, deduce, ascertain, and/or come to a decision, typically by investigation, reasoning, and/or calculation.

device—a machine, manufacture, and/or collection thereof.

different—changed, distinct, and/or separate.

diffuse—to widely spread and/or scatter.

dirty—contaminated.

dirty gas stream—an aerobic, hydrogen sulfide-containing, flow of gas.

drip—to shed and/or fall in drops.

during—at some time in a time interval.

each—every one of a group considered individually.

EDTA—ethylenediaminetetracetic acid.

effective—sufficient to bring about, provoke, elicit, and/or cause.

elemental—of, relating to, or denoting a chemical element.

embodiment—an implementation, manifestation, and/or a concrete representation, such as of a concept.

enter—to come and/or flow into.

environment—all external conditions that affect an organism or other specified system during its lifetime.

estimate—(n) a calculated value approximating an actual value; (v) to calculate and/or determine approximately and/or tentatively.

exemplary—serving as an example, model, instance, and/or illustration.

ferric—of, relating to, and/or containing iron, especially with valence 3 and/or in its plus-three oxidation state, Fe(III) (sometimes designated $Fe^{3+}$) and/or a valence higher than in a corresponding ferrous compound.

ferric chelate—any organic and inorganic polydentate ligand complexed with ferric ion, Fe(III), and/or ferrous ion, Fe(II), including the ferro aminocarboxylates (such as ferric/ferrous MGDA, ferric/ferrous EDTA, ferric/ferrous HEIDA, and/or ferric/ferrous NTA, etc.), ferric/ferrous gluconate, etc.

ferric/ferrous—ferric and/or ferrous.

ferro—iron-containing and/or ferric and/or ferrous.

ferrous—of or containing iron, especially with valence 2 and/or in its plus-two oxidation state, Fe(II) (sometimes designated $Fe^{2+}$) and/or a valence lower than in a corresponding ferric compound.

first—a label for a referenced element in one or more patent claims, but that label does not necessarily imply any type of ordering to how that element (or any other elements of a similar type) is implemented in embodiments of the claimed subject matter.

flow—(n) a stream and/or current; (v) to move and/or run smoothly with unbroken continuity, as in the manner characteristic of a fluid.

flow—to stream and/or continuously transfer.

for—with a purpose of.

form—to make, create, produce, generate, bring into being, and/or cause to exist.

forming— free—substantially lacking.

from—used to indicate a source, origin, and/or location thereof.

further—in addition.

gas—a substance in a gaseous state, that is, in a state of matter distinguished from the solid and liquid states by relatively low density and viscosity, relatively great expansion and contraction with changes in pressure and temperature, the ability to diffuse readily, and the spontaneous tendency to become distributed uniformly throughout any container; and/or a substance in a gaseous state.

generate—to create, produce, render, give rise to, and/or bring into existence.

gluconate—any salt or ester of gluconic acid greater than—larger and/or more than.

having—possessing, characterized by, comprising, and/or including but not limited to.

HEIDA—hydroxyethyliminodiacetic acid higher—greater than in an ordering.

hydrogen—an element defined by each atom comprising a single proton and a single electron.

hydrogen sulfide—a colorless poisonous gas with a smell of rotten eggs, made by the action of acids on sulfides.

including—having, but not limited to, what follows.

initialize—to prepare something for use and/or some future event.

inject—to place into an orbit, trajectory, and/or stream.

install—to connect or set in position and prepare for use.

into—to a condition, state, or form of and/or toward, in the direction of, and/or to the inside of.

introduce—to flow into, over, and/or through, and/or mix with, and/or to insert, inject, and/or put inside and/or into.

ion—an electrically charged atom or group of atoms formed by the loss or gain of one or more electrons, as a cation (positive ion), which is created by electron loss and is attracted to the cathode in electrolysis, or as an anion (negative ion), which is created by an electron gain and is attracted to the anode. The valence of an ion is equal to the number of electrons lost or gained and is indicated by a plus sign for cations and a minus sign for anions, thus: Na+, Cl—I—, Ca++, S iron—a silvery-white, lustrous, malleable, ductile, magnetic or magnetizable, metallic element occurring abundantly in combined forms, notably in hematite, limonite, magnetite, and taconite, and used alloyed in a wide range of important structural materials. Atomic number 26; atomic weight 55.845; melting point 1,535° C.; boiling point 2,750° C.; specific gravity 7.874 (at 20° C.); valence 2, 3, 4, 6.

is—to exist in actuality.

less than—having a measurably smaller magnitude and/or degree as compared to something else.

ligand—an ion, a molecule, or a molecular group that binds to another chemical entity to form a larger complex longitudinal—of and/or relating to a length; placed and/or running lengthwise.

longitudinal axis—a straight line defined parallel to an object's length and passing through a centroid of the object.

maintain—to retain, preserve, sustain, keep in an existing state, and/or continue to obtain.

malodorous—having a bad and/or foul odor.

manmade—a tangible physical item that is synthetic and/or made by humans rather than occurring in nature.

mass-to-mass ratio—the mass of a first substance expressed with respect to the mass of a second substance.

may—is allowed and/or permitted to, in at least some embodiments.

medium—any substance or material, such as one or more solids, liquids, vapors, fluids, water, and/or air, etc.

meter—a device adapted to detect and/or record a measured value.

method—one or more acts that are performed upon subject matter to be transformed to a different state or thing and/or are tied to a particular apparatus, said one or more acts not a fundamental principal and not pre-empting all uses of a fundamental principal.

MGDA—Methyl Glycine Di-Acetate, methylglycinediacetate, and/or trisodium methylglycinediacetate.

milligram—One one-thousandth of a gram.

mix—to combine, add, and/or blend one substance into another to form one mass, stream, and/or mixture.

molecule—the smallest particle of a substance that retains the chemical and physical properties of the substance and is composed of two or more atoms; and/or a group of like or different atoms held together by chemical forces.

more—a quantifier meaning greater in size, amount, extent, and/or degree.

mV—milliVolts.

natural gas—a flammable gas, consisting largely of methane and other hydrocarbons, occurring naturally underground (often in association with petroleum) and used as fuel.

nitrate—the univalent radical NO3 or a compound containing it, as a salt or an ester of nitric acid.

nitrate/nitrite—nitric acid, nitrous acid, and/or any salt, ester, alcohol, and/or oxidized ion of nitric acid or nitrous acid, having the molecular formula $NO^{3-}$ or $NO^{2-}$, such as calcium nitrate, sodium nitrate, ammonium nitrate, potassium nitrate, sodium nitrite, potassium nitrite, ammonium nitrite, and/or calcium nitrite, etc.

nitrite—the univalent radical NO2 or a compound containing it, such as a salt or an ester of nitrous acid.

nitrous oxide—a colorless nonflammable slightly soluble gas with a sweet smell that is used as an anesthetic in dentistry and surgery and has the formula $N_2O$.

no—an absence of and/or lacking any.

non-destructively—to perform substantially without damaging.

NTA—nitrilotriacetic acid occur—to happen, take place, and/or come about.

one—being and/or amounting to a single unit, individual, and/or entire thing, item, and/or object.

operable—practicable and/or fit, ready, and/or configured to be put into its intended use and/or service.

operative—when in operation for its intended use and/or service.

or—a conjunction used to indicate alternatives, typically appearing only before the last item in a group of alternative items.

organic—a compound containing carbon, which is further characterized by the presence in the molecule of two carbon atoms bonded together; or one atom of carbon bonded to at least one atom of hydrogen or halogen; or one atom of carbon bonded to at least one atom of nitrogen by a single or double bond.

oxidant (a.k.a. "oxidizing agent")—a substance, such as oxygen, hydrogen peroxide, calcium peroxide, magnesium peroxide, ozone, persulfate, chlorite, hypochlorite, chlorine, bromine, permanganate, peracetic acid, and/or chlorine dioxide, that oxidizes another substance, usually by accepting electrons.

oxidation—a chemical reaction in which an atom or ion loses electrons, thus undergoing an increase in valence, e.g., removing an electron from an iron atom having a valence of +2 changes the valence to +3.

oxidation-reduction—a reversible chemical process usually involving the transfer of electrons, in which one reaction is an oxidation and the reverse reaction is a reduction.

oxidation-reduction potential—in aqueous solutions, a measure of the tendency of the solution to either gain or lose electrons when it is subject to change by introduction of a new species.

oxide—any compound of oxygen with another element.

oxidize—to undergo and/or cause to undergo a chemical reaction and/or combination with oxygen; to convert (an element) into an oxide; to form and/or cause to form a layer of metal oxide, as in rusting; to add oxygen and/or any nonmetal; to lose and/or cause to lose hydrogen atoms; and/or to undergo and/or cause to undergo a decrease in the number of electrons, thereby increasing the valence.

oxidizing agent ("oxidant")—a substance, such as a oxygen, hydrogen peroxide, calcium peroxide, magnesium peroxide, ozone, persulfate, chlorite, hypochlorite, chlorine, bromine, permanganate, peracetic acid, and/or chlorine dioxide, that oxidizes another substance, usually by accepting electrons.

oxygen—a nonmetallic element, which constitutes approximately 21 percent of the earth's atmosphere by volume, which occurs as a diatomic gas, O2, and which is assigned atomic number 8, and has atomic weight 15.9994.

ozone—an allotrope of oxygen, O3. Ozone is a relatively reactive oxidant that can be used to purify water.

packed bed—a substantially hollow tube, pipe, tank, or other vessel that contains a substantial quantity of packing.

packing—a range of specially designed devices configured for use in vessels such as packed towers, absorption and distillation columns, and chemical reactors, etc., the devices typically comprising thin corrugated plastic and/or metal plates and/or gauzes arranged in a way that force fluids to take complicated paths through the vessel, thereby creating a large surface area for contact between different phases.

parallel—of, relating to, and/or designating lines, curves, planes, and/or surfaces everywhere equidistant.

per—for each and/or by means of.

perborate—any of certain salts derived, or apparently derived, from perboric acid and containing the radical and/or ion $BO_3$.

perchlorate—any salt or ester of perchloric acid and/or containing the radical and/or ion $ClO_4^-$.

perform—to begin, take action, do, fulfill, accomplish, carry out, and/or complete, such as in accordance with one or more criterion.

permanganate—any of the salts of permanganic acid, all of which are strong oxidants.

peroxide—a compound containing a bivalent —OO— group in the molecule.

perpendicular—intersecting at or forming substantially right angles.

persulfate—a sulphate of the peroxide of any base.

pH—a measure representing the base 10 logarithm of the reciprocal of hydrogen ion concentration in gram atoms per liter, used to express the acidity or alkalinity of a solution on a scale of 0 to 14, where less than 7 represents acidity, 7 neutrality, and more than 7 alkalinity.

plurality—the state of being plural and/or more than one.

portion—a part, component, section, percentage, ratio, and/or quantity that is less than a larger whole.

ppm—parts per million.

pre-—a prefix that precedes an activity that has occurred beforehand and/or in advance.

predetermine—to determine, decide, and/or establish in advance.

present—to introduce, provide, show, display and/or offer for consideration.

prevent—to hinder, avert, and/or keep from occurring.

prior—before and/or preceding in time or order.

probability—a quantitative representation of a likelihood of an occurrence.

product—something produced by human and/or mechanical effort.

project—to calculate, estimate, or predict.

provide—to furnish, supply, give, convey, send, and/or make available.

pure—having a substantially homogeneous and/or uniform composition, not mixed, and/or substantially free of foreign substances.

range—a measure of an extent of a set of values and/or an amount and/or extent of variation.

ratio—a relationship between two quantities expressed as a quotient of one divided by the other.

re-activate—to make active again and/or to restore the ability to function and/or the effectiveness of.

react—to cause (a substance or substances) to undergo a reaction.

reactants—substances that react in a chemical reaction.

reaction—a change and/or transformation in which a substance decomposes, combines with other substances, and/or interchanges constituents with other substances.

reaction product—something produced by a chemical reaction.

reactivate—to make active again.

receive—to get as a signal, take, acquire, and/or obtain.

recommend—to suggest, praise, commend, and/or endorse.

recycle—to treat and/or process (e.g., used and/or waste materials) so as to make suitable for reuse.

reduce—to make and/or become lesser and/or smaller.

remove—to eliminate, remove, and/or delete, and/or to move from a place or position occupied.

repeat—to do again and/or perform again.

repeatedly—again and again; repetitively.

request—to express a desire for and/or ask for.

result—(n.) an outcome and/or consequence of a particular action, operation, and/or course; (v.) to cause an outcome and/or consequence of a particular action, operation, and/or course.

said—when used in a system or device claim, an article indicating a subsequent claim term that has been previously introduced.

salt—a chemical compound formed by replacing all or part of the hydrogen ions of an acid with metal ions and/or electropositive radicals.

saturate—to cause (a substance) to unite with the greatest possible amount of another substance.

saturated—full and/or unable to hold and/or contain more.

scrubber—a treatment vessel containing packing and configured such that contaminated air and/or gas is diffused up from the bottom of the vessel through a decontaminating liquid and/or the decontaminating liquid is constantly recirculated from a sump to the top of the vessel and spray applied to the media at the top of the packing to flow, drip and/or rain down into a catchment sump as the contaminated air and/or gas moves up through the packing.

second—a label for an element in one or more patent claims, the element other than a "first" referenced element of a similar type, but the label does not necessarily imply any type of ordering to how that "second" element or the "first" element is implemented in embodiments of the claimed subject matter.

select—to make a choice and/or selection from alternatives.

separate—(n) distinct; (v) to disunite, space, set, or keep apart and/or to be positioned intermediate to.

serve—to be used by.

set—a related plurality of predetermined elements; and/or one or more distinct items and/or entities having a specific common property or properties.

sodium chlorite—an explosive, white, mildly hygroscopic, water-soluble powder, having the formula $NaClO_2$, that decomposes at 175° C. and is used as an analytical reagent and oxidant.

sodium percarbonate—a colorless, crystalline, hygroscopic, and water-soluble solid adduct of sodium carbonate and hydrogen peroxide (a perhydrate), with formula 2Na2CO3.3H2O2.

solution—a substantially homogeneous molecular mixture and/or combination of two or more substances.

sour gas—natural gas that contains greater than approximately 5.7 milligrams of hydrogen sulfide per cubic meter (ppm), which is roughly equivalent to 4 parts per million by volume under standard temperature and pressure.

source—an compound comprising and/or capable of generating.

species—a class of individuals and/or objects grouped by virtue of their common attributes and assigned a common name; a division subordinate to a genus.

spent—used up, consumed, exhausted, and/or depleted of effectiveness;

having been put to use and therefore unavailable for use.

spray—(n) water or other liquid moving in a mass of dispersed droplets;

(v) to disperse (a liquid, for example) in a mass or jet of droplets, particles, or small pieces.

state—a qualitative and/or quantitative description of condition.

store—to place, hold, and/or retain data, typically in a memory.

stream—a flow and/or current of fluid.

substantially—to a considerable, large, and/or great, but not necessarily whole and/or entire, extent and/or degree.

sulfide—any of hydrogen sulfide ($H_2S$), hydrosulfide ($HS^-$), and sulfide ion ($S^=$), which can form from dissolving gaseous hydrogen sulfide ($H_2S$) in water, the proportions of each dependent on the pH of the receiving aqueous solution.

sulfonate—an ester or salt of sulfonic acid.

sulfur—A pale yellow nonmetallic element, occurring widely in nature in several free and combined allotropic forms, which is used in black gunpowder, rubber vulcanization, the manufacture of insecticides and pharmaceuticals, and in the preparation of sulfur compounds such as hydrogen sulfide and sulfuric acid, and which has: atomic number 16; atomic weight 32.066; melting point (rhombic) 112.8° C., (monoclinic) 119.0° C.; boiling point 444.6° C.; specific gravity (rhombic) 2.07, (monoclinic) 1.957; and valence 2, 4, 6.

support—to bear the weight of, especially from below.

system—a collection of mechanisms, devices, machines, articles of manufacture, processes, data, and/or instructions, the collection designed to perform one or more specific functions.

that—used as the subject or object of a relative clause.

through—across, among, between, and/or in one side and out the opposite and/or another side of.

to—a preposition adapted for use for expressing purpose.

transform—to change in measurable: form, appearance, nature, and/or character.

transmit—to send as a signal, provide, furnish, and/or supply.

treat—to subject to a process, treatment, action, and/or change.

treatment—an act, manner, or method of handling and/or dealing with someone and/or something.

use—to put into service.

vessel—a container.

via—by way of, with, and/or utilizing.

wastewater—liquid and/or waterborne wastes generated by residential, commercial, and/or industrial operations, and potentially including sewage, excrement, dissolved solids, suspended solids, surface water, storm water, and/or groundwater.

weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.

when—at a time and/or during the time at which.

wherein—in regard to which; and; and/or in addition to.

with—accompanied by.

within—inside the limits of.

without—lacking.

zone—a region and/or volume having at least one predetermined boundary.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. References herein to "in one embodiment", "in an embodiment", or the like do not necessarily refer to the same embodiment.

Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects any person having ordinary skill in the art, after obtaining authorization from the inventor(s), to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly unsuitable, inoperable, or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential"; and within, among, and between any described embodiments:

any two or more described substances can be mixed, combined, reacted, separated, and/or segregated;

any described characteristic, function, activity, substance, component, and/or structural element, or any combination thereof, can be specifically included, duplicated, excluded, combined, reordered, reconfigured, integrated, and/or segregated;

any described interrelationship, sequence, and/or dependence between any described characteristics, functions, activities, substances, components, and/or structural elements can be omitted, changed, varied, and/or reordered;

any described activity can be performed manually, semi-automatically, and/or automatically;

any described activity can be repeated, performed by multiple entities, and/or performed in multiple jurisdictions.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values there between, such as for example, 1.1, 2.5, 3.335, 5, 6.179, 8.9999, etc., and includes all sub-ranges there between, such as for example, 1 to 3.65, 2.8 to 8.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim or claim element of this document is intended to invoke 35 USC 112(f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document when reasonably interpreted by a person having ordinary skill in the relevant art.

What is claimed is:

1. A method for treating an aerobic contaminated gas stream, comprising:

performing a first plurality of activities in a common vessel, the first plurality of activities comprising:

contacting the aerobic contaminated gas stream with a clean aqueous solution comprising approximately 0.5% ferric chelate to approximately 100% ferric chelate, the aerobic contaminated gas stream comprising air and comprising hydrogen sulfide at a concentration in the air of approximately 5 ppm or higher;

forming bonds between sulfide formed from the hydrogen sulfide and the iron in the ferric chelate to create:

an aerobic clean gas stream having a hydrogen sulfide concentration of 3.5 ppm or less; and a dirty aqueous solution comprising sulfide-saturated ferro chelate;

mixing the dirty aqueous solution with an oxidant; and via a reaction with the oxidant, breaking the bonds between the sulfide and the sulfide-saturated ferro chelate to form elemental sulfur mixed with a re-activated solution comprising re-activated ferric chelate;

separating the elemental sulfur from the re-activated solution to form a substantially hydrogen-sulfide-free solution; and re-cycling the substantially sulfide-free solution to serve as the clean aqueous solution.

2. The method of claim 1, wherein:

the common vessel is an atmospheric vessel.

3. The method of claim 1, further comprising:

repeating the first plurality of activities.

4. The method of claim 1, further comprising:

repeating the first plurality of activities without introducing additional ferric chelate to the clean aqueous solution.

5. The method of claim 1, wherein the first plurality of activities further comprises:

causing flow of the aerobic contaminated gas stream into the common vessel.

6. The method of claim 1, wherein:

said contacting comprises bubbling the aerobic contaminated gas stream through the clean aqueous solution.

7. The method of claim 1, wherein:
said contacting comprises blowing the aerobic contaminated gas stream into the clean aqueous solution.

8. The method of claim 1, wherein:
said contacting comprises spraying the clean aqueous solution into the aerobic contaminated gas stream.

9. The method of claim 1, wherein:
said contacting comprises dripping the clean aqueous solution into the aerobic contaminated gas stream.

10. The method of claim 1, wherein:
the clean aqueous solution has a pH of 5.9 or higher.

11. The method of claim 1, wherein:
the clean aqueous solution has a pH of 8 or higher.

12. The method of claim 1, wherein:
the oxidant is a peroxide.

13. The method of claim 1, wherein:
the oxidant is oxygen within the aerobic contaminated gas stream.

14. The method of claim 1, wherein:
the oxidant is oxygen.

15. The method of claim 1, wherein:
the oxidant is atmospheric oxygen.

16. A method comprising:
in a substantially aerobic treatment zone of a single vessel, reacting reactants comprising an active ferro chelate and an aerobic contaminated gas stream, the aerobic contaminated gas stream comprising air mixed with hydrogen sulfide, the hydrogen sulfide present at a concentration of at least 5 ppm, wherein:
reaction products of the reacting comprise:
a spent ferro chelate that comprises iron saturated with sulfide; and
a clean gas stream having a concentration of hydrogen sulfide of no greater than 3.5 ppm;
a content of the treatment zone is actively maintained at a pH of between approximately 5.9 and approximately 10; and
in the single vessel, via a reaction with an oxidant, separating the sulfide and the iron.

17. The method of claim 16, wherein:
the aerobic contaminated gas stream remains in contact with the active ferro chelate for at least 2.5 seconds.

18. The method of claim 16, wherein:
the active ferro chelate is recirculated at a rate of at least 0.055 gallons of active ferro chelate per cubic foot of the aerobic contaminated gas stream.

\* \* \* \* \*